United States Patent
Abney et al.

(10) Patent No.: US 12,465,904 B2
(45) Date of Patent: Nov. 11, 2025

(54) METAL-ORGANIC FRAMEWORKS HAVING LOCALIZED DEFECTS FOR GAS SEPARATIONS

(71) Applicant: ExxonMobil Technology and Engineering Company, Annandale, NJ (US)

(72) Inventors: Carter W. Abney, Athens, WI (US); Joseph M. Falkowski, Hampton, NJ (US); Simon C. Weston, Annandale, NJ (US); Anna C. Ivashko, Denville, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 889 days.

(21) Appl. No.: 17/624,610

(22) PCT Filed: Jun. 5, 2020

(86) PCT No.: PCT/US2020/036280
§ 371 (c)(1),
(2) Date: Jan. 4, 2022

(87) PCT Pub. No.: WO2021/011111
PCT Pub. Date: Jan. 21, 2021

(65) Prior Publication Data
US 2022/0266219 A1    Aug. 25, 2022

Related U.S. Application Data

(60) Provisional application No. 62/874,067, filed on Jul. 15, 2019.

(51) Int. Cl.
*B01J 20/22*    (2006.01)
*B01J 20/28*    (2006.01)
(Continued)

(52) U.S. Cl.
CPC ....... *B01J 20/226* (2013.01); *B01J 20/28054* (2013.01); *C07F 19/005* (2013.01); *B01J 37/04* (2013.01); *B01J 2540/66* (2013.01)

(58) Field of Classification Search
None
See application file for complete search history.

(56) References Cited

U.S. PATENT DOCUMENTS

| 9,861,953 B2 | 1/2018 | Long et al. | ............ B01J 20/226 |
| 10,780,388 B2 | 9/2020 | Long et al. | ........ B01D 53/1475 |

(Continued)

FOREIGN PATENT DOCUMENTS

| CA | 3000695 A1 * | 4/2017 | ........ B01D 53/0462 |
| WO | WO2013/059527 | 4/2013 | ............. B01J 20/04 |

(Continued)

OTHER PUBLICATIONS

"Safety Data Sheet for 2-(Aminomethyl)piperidine." Jubilant LifeSciences (2015). Viewed online on Mar. 14, 2025 at https://www.jubl.com/uploads/files/106msds_0221_Gj_Ghs02_Div.3_sds_2_Aminomethyl_Piperidine.pdf.*

(Continued)

*Primary Examiner* — Daniel Berns
(74) *Attorney, Agent, or Firm* — Shook, Hardy & Bacon L.L.P.

(57) ABSTRACT

Provided herein are adsorption materials comprising a metal-organic framework comprising metal ions of metals, a plurality of organic linkers and one or more modulator where each modulator forms a localized defect. Each organic linker in the plurality of organic linkers creates a bridge between metal ions. Each modulator is connected to only one metal chain. The adsorption material further comprises one or more ligands. Each ligand in the plurality of (Continued)

ligands can be an amine or other Lewis base (electron donor) appended to a metal ion of the metal-organic framework.

19 Claims, 12 Drawing Sheets

(51) Int. Cl.
  *C07F 3/02* (2006.01)
  *C07F 19/00* (2006.01)
  *B01J 37/04* (2006.01)

(56) References Cited

U.S. PATENT DOCUMENTS

| 11,014,067 | B2 | 5/2021 | Weston et al. | B01J 20/22 |
|---|---|---|---|---|
| 2016/0332948 | A1 | 11/2016 | Long et al. | C07C 45/27 |
| 2017/0081345 | A1 | 3/2017 | Yaghi et al. | C07F 5/069 |
| 2019/0039015 | A1 | 2/2019 | Long et al. | B01D 53/1475 |

FOREIGN PATENT DOCUMENTS

| WO | WO2015/127033 | 8/2015 | C07F 7/00 |
|---|---|---|---|
| WO | WO2020/219907 | 10/2020 | B01J 20/22 |

OTHER PUBLICATIONS

Botas, J. A. et al. (2011) "Effect of Zn/Co Ratio in MOF-74 Type Materials Containing Exposed Metal Sites on their Hydrogen Adsorption Behaviour and on their Band Gap Energy," *Int'l. Jrnl. of Hydro. Energy*, v.36(17), pp. 10834-10844.

Brunauer, S. et al. (1938) "Adsorption of Gases in Multimolecular Layers," *J. Am. Chem. Soc.*, v.60, pp. 309-319.

Builes, S. et al. (2013) "Isosteric Heats of Gas and Liquid Adsorption," *Langmuir*, v.29(33), pp. 10416-10422.

Forse, A. C. et al. (2018) "Revisiting Anisotropic Diffusion of Carbon Dioxide in the Metal-Organic Framework $Zn_2$(dobpdc)," *J. Phy. Chem. C.*, v.122(27), pp. 15344-15351.

Forse, A. C. et al. (2018) "Unexpected Diffusion Anisotropy of Carbon Dioxide in the Metal-Organic Framework $Zn_2$(dobpdc)," *J. Am. Chem. Soc.*, v.140(5), pp. 1663-1673.

Forse, A. C. et al. (2018) "Elucidating $CO_2$ Chemisorption in Diamine-Appended Metal-Organic Frameworks," *J. Am. Chem. Soc.*, v.140(51), pp. 18016-18031.

Jiao, L. et al. (2018) "Metal-Organic Frameworks: Structures and Functional Applications," *Materials Today*, v.27(19), pp. 43-68.

Karagiaridi, O. et al. (2014) "Solvent-Assisted Linker Exchange: An Alternative to the De Novo Synthesis of Unattainable Metal-Organic Frameworks," *Angewandte Chem. Int. Ed.*, v.53(18), pp. 4530-4540.

Langmuir, I. (1916) "The Constitution and Fundamental Properties of Solids and Liquids. Part 1. Solids," *J. Am. Chem. Soc.*, v.38(11), pp. 2221-2295.

Lucier, B. (2016) "Multiple Modes of Motion: Realizing the Dynamics of CO Adsorbed in M-MOF-74 (M = Mg, Zn) by Using Solid-State NMRSpectroscopy," *Eur. J. Inorg. Chem.*, v,2016, pp. 2017-2024.

McDonald, T. M. et al. (2012) "Capture of carbon dioxide from air and flue gas in the alkylamine-appended metal-organic framework mmen-Mg2(dobpdc)," *J. Am. Chem. Soc.*, v.134(16), pp. 7056-7065.

McDonald, T. M. et al. (2015) "Cooperative insertion of $CO_2$ in diamine-appended metal-organic frameworks," *Nature*, v.519, pp. 303-308.

Milner, P. J. et al. (2017) "A Diaminopropane-Appended Metal-Organic Framework Enabling Efficient $CO_2$ Capture from Coal Flue Gas via a Mixed Adsorption Mechanism," *J. Am. Chem. Soc.*, v.139(38), pp. 13541-13553.

Milner, P. J. et al. (2018) "Overcoming double-step $CO_2$ adsorption and minimizing water co-adsorption in bulky diamine-appended variants of Mg2(dobpdc)," *Chem. Sci.*, v.9, pp. 160-174.

Morris, W. et al. (2017) "Role of Modulators in Controlling the Colloidal Stability and Polydispersity of the Ui0-66 Metal-Organic Framework," *ACS Appl. Materials & Interfaces*, v.9(39), pp. 33413-33418.

Pachfule, Pradip et al. (2016) "Fabrication of Carbon Nanorods and Graphene Nanoribbons from a Metal-Organic Framework," *Nature Chem.*, v. 8(7), pp. 718-724.

Planas, N. et al. (2013) "The Mechanism of Carbon Dioxide Adsorption in an Alkylamine-Functionalized Metal-organic Framework," *J. Am. Chem. Soc.*, v.135(20), pp. 7402-7405.

Pramchu, S. et al.(2018) "Tuning carbon dioxide capture capability with structural and compositional design in mmen-(Mg,Zn) (dobpdc) metal-organic framework: density functional theory investigation," *Greenhouse Gases: Sci. and Tech.*, v.8(3), pp. 580-586.

Quadrelli, R. et al. (2007) "The energy-climate challenge: Recent trends in CO2 emissions from fuel combustion," *Energy Policy*, v.35(11), pp. 5938-5952.

Rubio-Gimenez, V. et al. (2017) "Spontaneous Magnetization in Heterometallic NiFe—MOF-74 Microporous Magnets by Controlled Iron Doping," *Chem. of Materials*, v.29(15), pp. 6181-6185.

Schoedel, A. et al. (2016) "Structures of Metal-Organic Frameworks with Rod Secondary Building Units," *Chem. Rev.*, v.116(19), pp. 12466-12535.

Shearer, G. C. et al. (2016) "Defect Engineering: Tuning the Porosity and Composition of the Metal-Organic Framework Ui0-66 via Modulated Synthesis," *Chem. of Mat.*, v.28(11), pp. 3749-3761.

Siegelman, R. L. et al. (2017) "Controlling Cooperative $CO_2$ Adsorption in Diamine-Appended Mg2(dobpdc) Metal—Organic Frameworks," *J. Am. Chem. Soc.*, v.139(30), pp. 10526-10538.

Sircar, S. et al. (1999) "Isosteric Heat of Adsorption: Theory and Experiment," *The Journal of Physical Chemistry B*,v.103(31), pp. 6539-6546.

Walton, K. S. et al. (2007) "Applicability of the BET Method for Determining Surface Areas of Microporous Metal-Organic Frameworks," *J. Am. Chem. Soc.*, v.129(27), pp. 8552-8556.

Wu, H. et al. (2013) "Unusual and Highly Tunable Missing-Linker Defects in Zirconium Metal-Organic Framework Ui0-66 and Their Important Effects on Gas Adsorption," *Jrnl. Amer. Chem. Soc.*, v.135(28), pp. 10525-10532.

\* cited by examiner

METAL-ORGANIC FRAMEWORKS HAVING LOCALIZED DEFECTS FOR GAS SEPARATIONS

FIELD

The present invention relates to metal-organic frameworks useful in gas separations, and more particularly relates to metal-organic frameworks comprising localized defects which increase the diffusion of gases into the framework and speed and efficiencies in the gas separation process.

BACKGROUND

The combustion of fossil fuels results in emission of $CO_2$, a large component of anthropogenic contributions to global climate change. In addition to environmental effects, tax penalties and/or incentives related to $CO_2$ emissions pose a significant financial consideration for infrastructure development, energy production, and manufacturing. The crux of the problem is that the concentration of $CO_2$ emitted can vary dramatically between applications, and is most commonly diluted with the benign atmospheric gas $N_2$. Nevertheless, the quantity of $CO_2$ emitted is massive. Thus, what is required is a technology capable of selectively removing diluted $CO_2$ from gas streams, with performance which can be tuned for implementation in diverse applications, and where the $CO_2$ can be easily and economically recovered for use or storage in turn regenerating the adsorbent technology for reuse.

Prior solutions for $CO_2$ capture primarily focus on liquid amine solutions, which are expensive to regenerate, cause engineering challenges due to changes in physical properties as $CO_2$ is adsorbed, and are mildly corrosive. More recently developed technologies include water-lean solutions, which display modest improvements in $CO_2$ capture performance, but are markedly more expensive than aqueous amines and still suffer from engineering challenges due to changes in physical properties. Solid-phase adsorbents, such as polymers and zeolites, have also been explored for $CO_2$ capture. The former typically suffer from low selectivity and poor capacity, while the latter are readily de-activated by water, requiring impractical pre-treatment of emissions prior to $CO_2$ removal.

Certain metal-organic frameworks ("MOF") perform well in various gas separations, especially for $CO_2$ capture. The performance of these frameworks can be attributed, in large part, to the structure of the framework comprising hexagonal channels lined with metal chains (sometimes referred as metal clusters) and vacant coordination sites. The hexagonal channels are isolated from each other, however, preventing diffusion of gas perpendicular to the direction of the channel. As a result, the one-dimensional model slows the diffusion of gases into the framework and lowers the maximum concentration gradient of the feed. This effect is exacerbated in certain metal-organic frameworks, such as MOF-274, that tend to form long rod-shaped crystals with the channels running down a long axis.

A need exists, therefore, for metal-organic frameworks which allow gas to diffuse between parallel channels in multidimensional flow, while preserving the shape of the channels and accessibility of the open metal sites.

SUMMARY

Provided herein are metal-organic frameworks, including mixed-metal-organic frameworks, comprising "localized defects" or openings through the controlled inclusion of modulators, molecules possessing an identical or equivalent metal coordinating site as an organic linker that bridges metal ions within the metal-organic framework. In an aspect, the present mixed-metal-organic frameworks further comprise a metal rod structure, defined as a metal chain, described by the Lidin-Andersson helix, as described by Schoedel, Li, Li, O'Keeffe, and Yaghi, Chem Rev. 2016 116, 12466-12535. In an aspect, the mixed-metal-organic framework has a hexagonal pore oriented parallel to the metal rod structure. Hence, the subject metal-organic frameworks have an empirical or chemical formula of one or more distinct metallic elements bridged by the organic linker and further comprise localized defects (openings) generated by the modulator binding to only one metal chain.

Specifically, the present metal-organic frameworks comprise a plurality of organic linkers, each linker comprising two or more aromatic rings, each aromatic ring comprising a carboxylate functional group and an alcohol functional group. The carboxylate functional group, and the alcohol functional groups are adjacent to one another on each aromatic ring. In addition, each aromatic ring is positioned at a greatest distance from the other. The present metal-organic frameworks also comprise one or more modulators, each modulator comprising a coordinating site equivalent to that of an organic linker to form a localized defect. The present metal-organic frameworks are especially for $CO_2$ capture and applications thereof. As a result of the localized defects, gas diffusion is improved in the separation process.

Further provided are metal-organic frameworks having the formula: $M^1_x M^2_{(2-x)}(A)$ where $M^1$ and $M^2$ are each independently different metal cations, X is a value from 0 to 2.0, and A is one or more organic linkers, and at least one or more modulators. In an aspect, A is 70 to 99 percent organic linker and 1 to 30 percent modulator by atomic composition. In an aspect, $M^1$ and $M^2$ can be independently a divalent metal cation.

In an aspect, $M^1$ and $M^2$ are selected independently from $Ca^{2+}$, $Mg^{2+}$, $Fe^{2+}$, $Cr^{2+}$, $V^{2+}$, $Mn^{2+}$, $Co^{2+}$, $Ni^{2+}$, $Zn^{2+}$, $Cu^{2+}$.

In an aspect, A is a plurality of disalicylate organic linkers selected independently from a group consisting of:

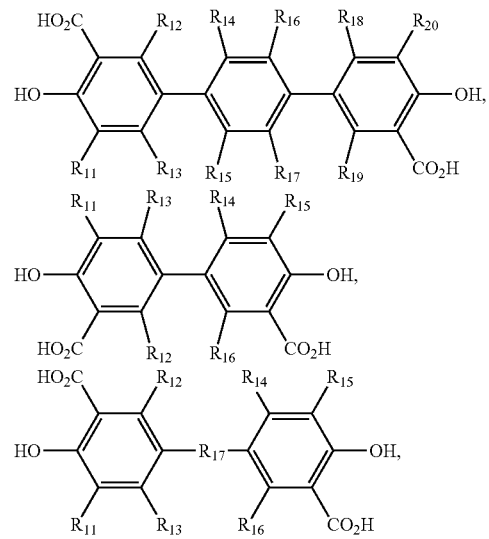

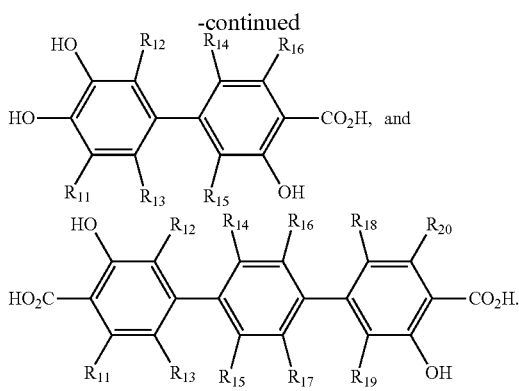

wherein $R_{11}$, $R_{12}$, $R_{13}$, $R_{14}$, $R_{15}$, $R_{16}$, $R_{17}$, $R_{18}$, $R_{19}$, and $R_{20}$ are each independently selected from H, halogen, hydroxyl, methyl, and halogen substituted methyl; and $R_{17}$ is selected from the group consisting of substituted or unsubstituted aryl, vinyl, alkynyl, substituted or unsubstituted heteroaryl, divinyl benzene, and diacetyl benzene.

Further provided herein are metal-organic framework systems, each metal-organic framework system comprises the present metal-organic framework having localized defects and a ligand where the ligand comprises an amine. In an aspect, the ligand is a diamine. In an aspect, the diamine is a cyclic diamine. In an aspect, the diamine is independently selected from:

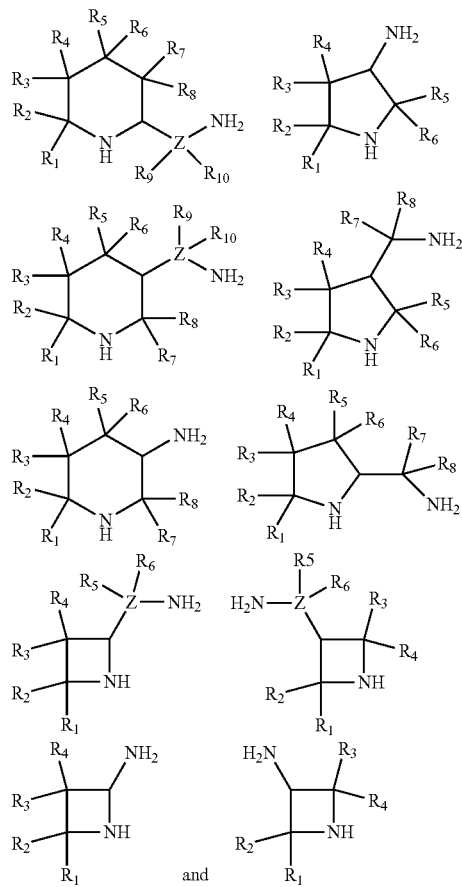

wherein Z is independently selected from carbon, silicon, germanium, sulfur and selenium; and $R_1$, $R_2$, $R_3$, $R_4$, $R_5$, $R_6$, $R_7$, $R_8$, $R_9$, and $R_{10}$, are each independently selected from H, halogen, methyl, halogen substituted methyl and hydroxyl.

In an aspect, the diamine ligand is selected from one of: dimethylethylenediamine (mmen) or 2-(aminomethyl)piperidine (2-ampd). In an aspect, the ligand is a tetramine. In an aspect, the tetramine is selected from one of 3-4-3 tetramine (spermine) or 2-2-2 tetramine.

In an aspect, the metal-organic framework system further comprises a secondary ligand, where the secondary ligand is a triamine. In an aspect, the secondary ligand is selected from:

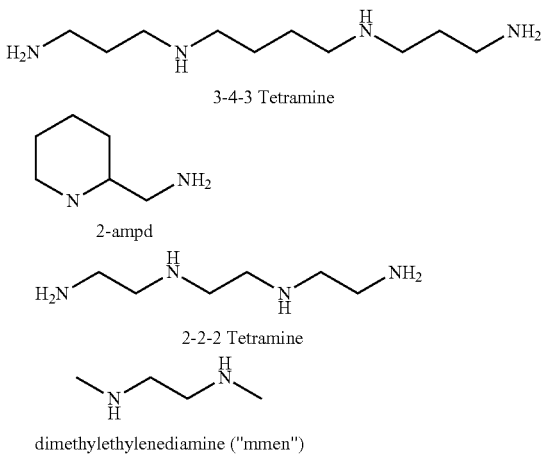

In an aspect, the modulator is selected independently from a group of salicylic acid and 3-hydroxypropionic acid.

Modulators can include carboxylic acid/carboxylate species such as formate, acetate, propionate, butyrate, pentanate, hexanate, lactate, oxalate, citrate, pivalate, carboxylate anions of amino acids, and the like; chelators such as aconitic acid, alanine diacetic acid (ADA), alkoyl ethylene diamine triacetic acids (e.g., lauroyl ethylene diamine triacetic acids (LED3A)), aminotri (methylenephosphonic acid) (ATMP), asparticaciddiacetic acid (ASDA), asparticacidmonoacetic acid, diamino cyclohexane tetraacetic acid (CDTA), citraconic acid, citric acid, 1,2-diaminopropanetetraacetic acid (DPTA-OH), 1,3-diamino-2-propanoltetraacetic acid (DTPA), diethanolamine, diethanol glycine (DEG), diethylenetriaminepentaacetic acid (DTPA), diethylene triamine pentamethylene phosphonic acid (DTPMP), diglycolic acid, dipicolinic acid (DPA), ethanolaminediacetic acid, ethanoldiglycine (EDG), ethionine, ethylenediamine (EDA), ethylenediaminediglutaric acid (EDDG), ethylenediaminedi(hydroxyphenylacetic acid (EDDHA), ethylenediaminedipropionic acid (EDDP), ethylenediaminedisuccinate (EDDS), ethylenediaminemonosuccinic acid (EDMS), ethylenediaminetetraacetic acid (EDTA), ethylenediaminetetrapropionic acid (EDTP), ethyleneglycolaminoethylestertetraacetic acid (EGTA), gallic acid, glucoheptonic acid, gluconic acid, glutamicaciddiacetic acid (GLDA), glutaric acid, glyceryliminodiacetic acid, glycinamidedisuccinic acid (GADS), glycoletherdiaminetetraacetic acid (GEDTA), 2-hydroxyethyldiacetic acid, hydroxyethylenediaminetriacetic acid (HEDTA), hydroxyethyldiphosphonic acid (HEDP), 2-hydroxyethyl imino diacetic acid (HIMDA), hydroxyiminodiacetic acid (HIDA), 2-hydroxy propylene diamine disuccinic acid (HPDDS), iminodiacetic acid (IDA), iminodisuccinic acid (IDS), itaconic acid, lauroyl ethylene diamine triacetic acids (LED3A), malic acid, malonic acid, methylglycinediacetate (MGDA), methyliminodiacetic acid (MIDA), monoethanolamine, nitrilotriacetic acid (NTA), nitrilotripropionic acid (NPA), N-phosphonomethyl glycine (glyphosate), propyldiamine tetraacetic acid (PDTA), salicylic acid, serinediacetic acid (SDA), sorbic acid, succinic acid, sugars, tartaric acid, tartronic acid, triethanolamine, triethylenetetraamine, triethylene tetraamine hexaacetic acid (TTHA), and combinations thereof. Other exemplary modulators are identified in US Publication No. 2017/0081345 at ¶¶ [0108] to [0112], incorporated herein by reference.

Also provided are methods of synthesizing a metal-organic framework comprising the steps of: contacting a solution comprising one or more sources of distinct metallic elements, an organic linker capable of bridging two metal chains and a modulator capable of binding to only one metal chain, and heating the solution to produce one or more of the present metal-organic frameworks having at least one localized defect made, created or otherwise formed by the modulator. In an aspect, the two or more distinct metallic elements are independently selected from Ca, Mg, Fe, Cr, V, Mn, Co, Ni, Zn, Cu.

DETAILED DESCRIPTION

Figure 1:
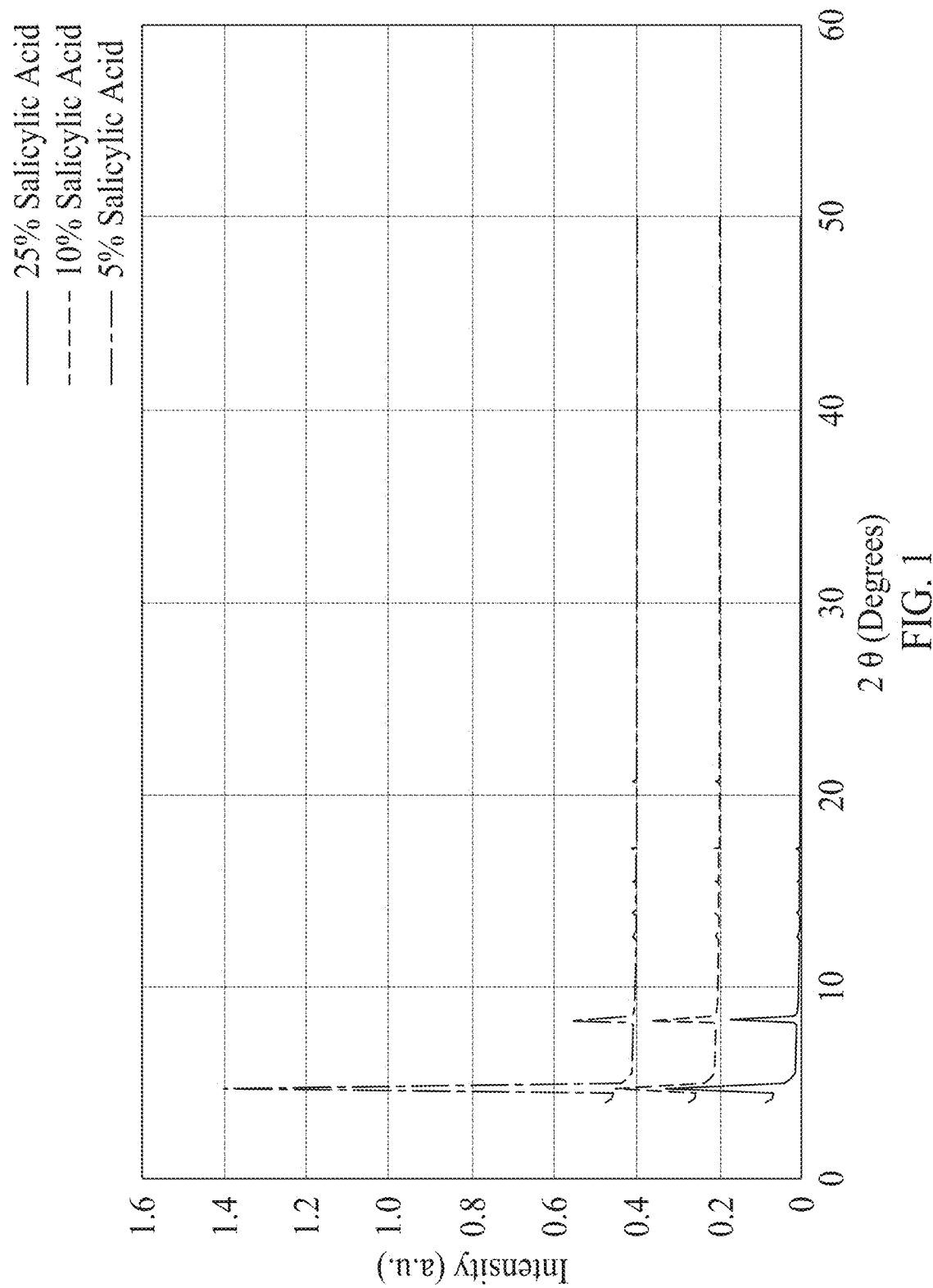
FIG. 1 is a graphical representation of powder x-ray diffraction ("PXRD") pattern for modulated MOF-274, a metal-organic framework ("MOF"), containing 5-25% salicylic acid.

Provided herein are metal-organic frameworks comprising metal chains (sometimes referred to as metal clusters), each metal chain comprising metal ions of one or more distinct elements, one or more organic linkers and one or more modulators. Each organic linker is connected to the metal ions of one or more distinct elements bridging at least two metal chains of the metal-organic framework. Conversely, each modulator is connected to only one distinct metal chain to form a localized defect in the metal-organic framework.

Further provided are metal-organic framework systems comprising a metal-organic framework having one or more localized defects and one or two ligands. In an aspect, the present metal-organic frameworks comprise one or more distinct elements independently selected from the group of Mg, Ca, V, Mn, Cr, Fe, Co, Ni, Cu and Zn. In an aspect, each of the one or more distinct elements is Mg, Mn, Ni, or Zn. In an aspect, the metal-organic framework comprises a ligand selected from the group of diamine, cyclic diamine, triamine, and/or tetramine. In an aspect, the ligand is an organic diamine. In an aspect, the ligand is amine 2-(aminomethyl)piperidine ("2-ampd").

Also, provided is an adsorbent material comprising one or more of the metal-organic framework systems described herein. Further provided are methods of removing carbon dioxide from a feed comprising the step of passing the feed over the present metal-organic frameworks having localized defects.

In an aspect, provided herein is a metal-organic framework of general structural Formula I

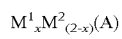    I wherein $M^1$ is a metal or salt thereof, and $M^2$ is a metal or salt thereof, but $M^1$ is not $M^2$; X is a value from 0.00 to 2.0; and A comprises one or more organic linkers and one or more modulators, wherein each modulator creating a localized defect.

In an aspect, the metal-organic framework of general structural Formula I can further comprise solvent molecules coordinating to the metals $M^1$, $M^2$.

Moreover, the metal-organic framework of general structural Formula I, with coordinating solvent molecules, can contain entrained solvent within the channels and pores of the material.

Further, in an aspect, provided is a metal-organic framework system of general structural Formula II

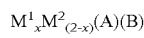    II wherein $M^1$ is independently selected from Mg, Ca, V, Mn, Cr, Fe, Co, Ni, Cu and Zn; $M^2$ is independently selected from Mg, Ca, V, Mn, Cr, Fe, Co, Ni, Cu and Zn, and $M^1$ is not $M^2$; X is a value from 0.00 to 2.00; A is an organic linker and an organic modulator; and B is a ligand, wherein each modulator forms or otherwise provides a localized defect.

Moreover, the metal-organic framework of general structural Formula II, can contain entrained solvent within the channels and pores of the material.

Before the present methods and devices are disclosed and described, it is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

For the purposes of this disclosure, the following definitions will apply:

As used herein, the terms "a" and "the" as used herein are understood to encompass the plural as well as the singular.

As used herein, the term "heteroatom" includes oxygen (O), nitrogen (N), sulfur (S) and silicon (Si), boron (B) and phosphorous (P).

The term "aryl" means, unless otherwise stated, a polyunsaturated, aromatic substituent that can be a single ring or multiple rings fused together or linked covalently. In an aspect, the substituent has from 1 to 11 rings, or more specifically, 1 to 3 rings. The term "heteroaryl" refers to aryl substituent groups (or rings) that contain from one to four heteroatoms selected from N, O and S, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

As used herein, the terms "alkyl," "aryl," and "heteroaryl" can optionally include both substituted and unsubstituted forms of the indicated species. Substituents for the aryl and heteroaryl groups are generically referred to as "aryl group substituents." The substituents are selected from, for to example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO.sub.2R', —CONR'R", —OC(O)NR'R", —NR"C(O)R', —NR'—C(O)NR"R'", —NR"C(O).sub.2R', —NR—C(NR'R"R'").dbd.NR"", —NR—C(NR'R")=NR'", —S(O)R', —S(O)R', —S(O)NR'R", —NRSOR', —CN and, —R', —CH(Ph), fluoro($C_1$-$C_4$)alkoxy, and fluoro($C_1$-$C_4$)alkyl, in a number ranging from zero to the total number of open valences on the aromatic ring system. Each of the above-named groups is attached to the aryl or heteroaryl nucleus directly or through a heteroatom (e.g., P, N, O, S, Si, or B); and where R', R", R'" and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R'", and R"" groups when more than one of these groups is present.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl."

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)$_2$—$CH_3$, —CH=CH—O—$CH_3$, —Si($CH_3$)$_3$, —$CH_2$—CH=N—$OCH_3$, and —CH=CH—N($CH_3$)—$CH_3$. Up to two heteroatoms may be consecutive, such as, for example, —$CH_2$—NH—$OCH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —$CO_2R'$— represents both —C(O)OR' and —OC(O)R'.

As used herein, the term "ligand" means a molecule containing one or more substituent groups capable of functioning as a Lewis base (electron donor). In an aspect, the ligand can be oxygen, phosphorus or sulfur. In an aspect, the ligand can be an amine or amines containing 1 to 10 amine groups.

The terms "halo," "halogen," or "halide," by themselves or as part of another substituent, mean, unless otherwise stated, a fluorine, chlorine, bromine, or iodine atom.

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

As used herein, the term "Periodic Table" means the Periodic Table of the Elements of the International Union of Pure and Applied Chemistry (IUPAC), dated December 2015.

As used herein, an "isotherm" refers to the adsorption of an adsorbate as function of concentration while the temperature of the system is held constant. In an aspect, the adsorbate is $CO_2$ and concentration can be measured as $CO_2$ pressure. As described herein, isotherms can be performed with porous materials and using various mathematical models applied to calculate the apparent surface area. S. Brunauer, P. H. Emmett, and E. Teller. *J. Am. Chem. Soc.*

1938, 60, 309-319; K. Walton and R. Q. Snurr, *J. Am. Chem. Soc.* 2007, 129, 8552-8556; I. Langmuir, *J. Am. Chem. Soc.* 1916, 38, 2221.

As used herein, the term "step" in an isotherm is defined by a sigmoidal absorption profile, otherwise known as a Type-V isotherm. S. J. Gregg and K. S. W. Sing, *Adsorption, Surface Area and Porosity*, 2$^{nd}$ Ed. Academic Press Inc., New York, N.Y., 1982, Ch V. The step can be generally defined by a positive second derivative in the isotherm, followed by an inflection point and a subsequent negative second derivative in the isotherm. The step occurs when adsorbent binding sites become accessible only at certain gas partial pressures, such as when $CO_2$ inserts into a metal-amine bond, or alternatively, when a dynamic framework pore is opened.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium, calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present disclosure contain both basic and acidic functionalities that allow the compounds to be converted into either base or acid addition salts. Hydrates of the salts are also included.

The term "modulator" as used herein, refers to an organic compound comprising a functional group capable of chelating or coordinating with a metal ion or metal ions within a single metal chain. The present modulators are incapable of binding metal ions contained within two discrete metal chains. Hence, the present metal-organic frameworks cannot be composed solely of metal ions and modulators.

Preferably a modulator contains coordinating atoms in the same molecular structure as is comprised in the linker.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure or be stereoisomeric mixtures. In addition, it is understood that, in any compound described herein having one or more double bond(s) generating geometrical isomers that can be defined as E or Z, each double bond may independently be E or Z or a mixture thereof. Likewise, it is understood that, in any compound described, all tautomeric forms are also intended to be included.

In addition, the compounds provided herein may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the subject compounds, whether radioactive or not, are intended to be encompassed within the scope of present disclosure.

Further provided are metal-organic frameworks comprising a plurality of metal ions of one or more distinct elements, a plurality of organic linkers, where each linker is connected to at least one metal ion of the plurality of metal ions of one or more distinct elements, and one or more modulators forming a localized defect. Noteworthy is that the present metal-organic frameworks having metal ions of two or more distinct elements are also referred to herein as a "mixed-metal-organic framework." Similarly, a mixed-metal mixed-organic framework system comprises a mixed-metal-organic framework having at least one localized defect, and a ligand.

In an aspect, the metal-organic framework presented herein has the general Formula I:

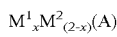

$$M^1{}_x M^2{}_{(2-x)}(A) \qquad \text{I}$$

wherein $M^1$ is a metal and $M^2$ is a metal, but $M^1$ is not $M^2$;
X is a value from 0.00 to 2.0; and
A is an organic linker and a modulator as described herein.

In an aspect, the metal-organic framework of general structural Formula I can further comprise solvent molecules coordinating to the metals $M^1$, $M^2$.

Moreover, the metal-organic framework of general structural Formula I, with coordinating solvent molecules, can contain entrained solvent within the channels and pores of the material.

In an aspect, X is a value from 0.00 to 2.0. In an aspect, X is a value from 0.1 to 1. In an aspect, X is a value selected from the group consisting of 0.05, 0.1, 0.5 and 1. Further, while X and 2–X represent the relative ratio of $M^1$ to $M^2$, it should be understood that any particular stoichiometry is not implied in Formula I, Formula IA, Formula II or Formula III described herein. As such, the metal-organic frameworks of the Formula I, IA, II or III are not limited to a particular relative ratio of $M^1$ to $M^2$. It should be understood that when X has a value of 2.0, the metal-organic framework comprises only one metal. It is further understood that the metals are typically provided in ionic form and available valency will vary depending on the metal selected.

The metal of Formula I, IA, II and III described herein can be one of the elements of Period 4 Groups IIA, IIIB, IVB, VB, VIB, VIIB, VIII, IB and IIB of the Periodic Table and Period 3 Group IIA including Mg, Ca, V, Mn, Cr, Fe, Co, Ni, Cu and Zn. Furthermore, the mixed-metal-organic framework comprises two more distinct elements as well as different combination of metals, theoretically represented as $M^1{}_x M^2{}_y \ldots M''{}_z(A)(B)_2 | x+y+ \ldots +z=2$ and $M^1 \neq M^2 \neq \ldots \neq M''$.

In an aspect, $M^1$ is selected from Mg, V, Ca, Mn, Cr, Fe, Co, Ni, Cu and Zn; and $M^2$ is selected from Mg, V, Ca, Mn, Cr, Fe, Co, Ni, Cu and Zn, provided that $M^1$ is not $M^2$. In an aspect, $M^1$ is selected from the group consisting of Mg, Mn, Ni and Zn; and $M^2$ is selected from the group consisting of Mg, Mn, Ni and Zn; provided $M^1$ is not $M^2$. In an aspect, $M^1$ is Mg and $M^2$ is Mn. In an aspect, $M^1$ is Mg and $M^2$ is Ni. In an aspect, $M^1$ is Zn and $M^2$ is Ni. It is further understood that the metals are typically provided in an ionic form and the valency will vary depending on the metal selected. Further, the metals can be provided as a salt or in salt form.

In addition, the metal can be a monovalent metal that would make A the protonated form of the linker H-A. For example, the metal can be Na$^+$ or one from Group I. Also, the metal can be one of two or more divalent cations ("divalent metals") or trivalent cations ("trivalent metals"). In an aspect, the mixed metal mixed organic framework includes metals which are at oxidation states other than +2 can (i.e., more than just divalent, trivalent tetravalent, . . . ). The framework can have metals comprising a mixture of different oxidation states. Exemplary mixtures include Fe(II) and Fe(III), Cu(II) and Cu(I) and/or Mn(II) and Mn(III). More specifically, trivalent metals are metals having a +3 oxidation state. Some metals used to form the mixed-metal-organic framework, specifically Fe and Mn, can adopt +2 (divalent) or +3 (trivalent) oxidation states under relatively gentle conditions. Chem. Mater, 2017, 29, 6181. Likewise, Cu(II) can form Cu(I) under gentle conditions. As such, any minor change to the oxidation state of any of the metals and/or selective change in the oxidation state of a metal can be used to modify the present mixed-metal-organic frameworks. Furthermore, any combination of different molecular fragments $C_1$, $C_2$, . . . $C_n$ may exist. Finally, all of the above variations can be combined, for example, multiple metals (two or more distinct metals) with multiple valences and multiple charge-balancing molecular fragments.

Suitable organic linkers (also referred to herein as "linkers") can be determined from the structure of the metal-organic framework and the symmetry operations that relate the portions of the organic linker that bind to the metal node of the metal-organic framework. A ligand which is chemically or structurally different, yet allows the functional groups which will bind the metals to form the metal chains to be related by a $C_2$ axis of symmetry, will form a metal-organic framework of an identical topology. In an aspect, the organic linker can be formed by two phenyl rings joined at carbon 1,1', with carboxylic acids on carbons 3, 3', and alcohols on carbons 4,4'. Switching the position of the carboxylic acids and the alcohols (e.g., "pc-$H_4$DOBPDC" or "pc-MOF-274" described below) does not change the topology of the metal-organic framework.

Examples of such linkers include:

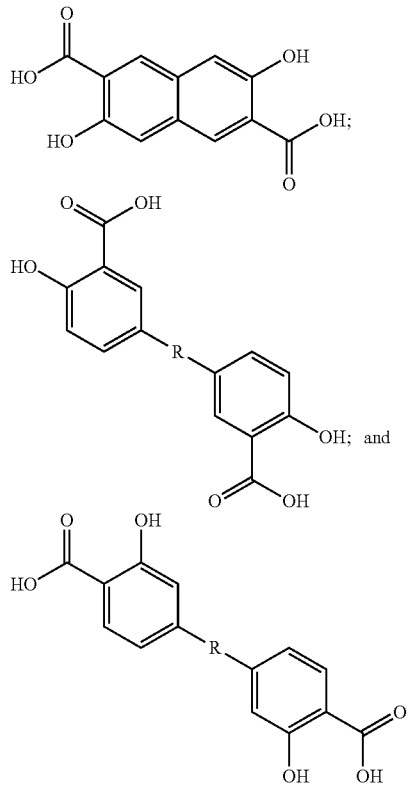

where R is any molecular fragment, or is absent and the linker comprises the direct connection of the two aromatic rings by a solitary carbon-carbon bond.

Examples of suitable organic linkers include para-carboxylate ("pc-linker") such as 4,4'-dioxidobiphenyl-3,3'-dicarboxylate (DOBPDC); 4,4"-dioxido-[1,1':4',1"-terphenyl]-3,3"-dicarboxylate (DOTPDC); and dioxidobiphenyl-4,4'-dicarboxylate (para-carboxylate-DOBPDC also referred to as PC-DOBPDC) as well as the following compounds:

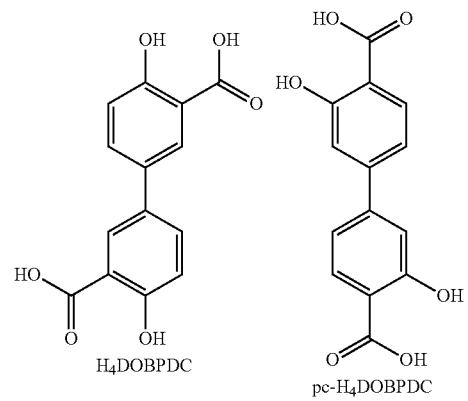

$H_4$DOBPDC pc-$H_4$DOBPDC

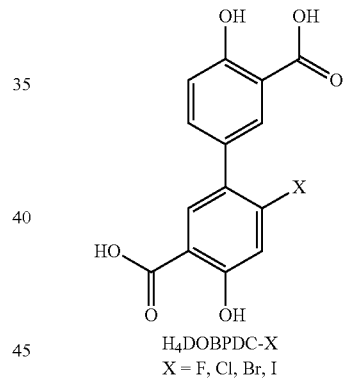

$H_4$DOBPDC-X
X = F, Cl, Br, I

In an aspect, the organic linker has the formula:

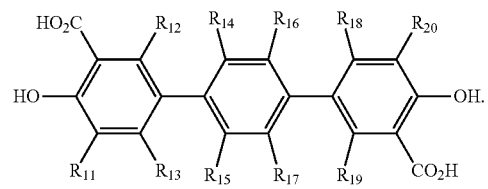

where $R_{11}$, $R_{12}$, $R_{13}$, $R_{14}$, $R_{15}$, $R_{16}$, $R_{17}$, $R_{18}$, $R_{19}$, and $R_{20}$ are each independently selected from H, halogen, hydroxyl, methyl, and halogen substituted methyl.

In an aspect, the organic linker has the formula:

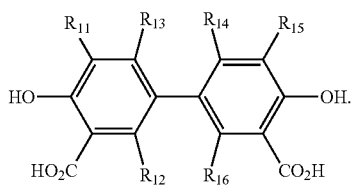

where, $R_{11}$, $R_{12}$, $R_{13}$, $R_{14}$, $R_{15}$, and $R_{16}$ are each independently selected from H, halogen, hydroxyl, methyl, and halogen substituted methyl.

In an aspect, the organic linker has the formula:

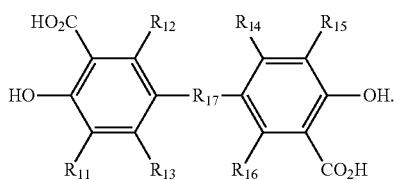

where $R_{11}$, $R_{12}$, $R_{13}$, $R_{14}$, $R_{15}$, and $R_{16}$ are each independently selected from H, halogen, hydroxyl, methyl, or halogen substituted methyl, and $R_{17}$ is selected from substituted or unsubstituted aryl, vinyl, alkynyl, and substituted or unsubstituted heteroaryl.

In an aspect, the organic linker has the formula:

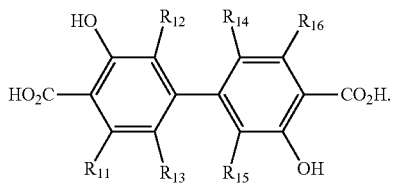

where $R_{11}$, $R_{12}$, $R_{13}$, $R_{14}$, $R_{15}$, and $R_{16}$ are each independently selected from H, halogen, hydroxyl, methyl, or halogen substituted methyl.

where $R_{11}$, $R_{12}$, $R_{13}$, $R_{14}$, $R_{15}$, and $R_{16}$ are each independently selected from H, halogen, hydroxyl, methyl, or halogen substituted methyl, and $R_{17}$ is selected from substituted or unsubstituted aryl, vinyl, alkynyl, and substituted or unsubstituted heteroaryl.

In an aspect, the organic linker includes multiple bridged aryl species such as molecules having two (or more) phenyl rings or two phenyl rings joined by a vinyl or alkynyl group.

In an aspect, provided herein the metal-organic framework of structural Formula IA:

$$M^1{}_x M^2{}_{(2-x)}(A) \qquad \text{IA}$$

wherein $M^1$ is a metal independently selected from Mg, Ca, V, Mn, Cr, Fe, Co, Ni, Cu or Zn, or salt thereof;

$M^2$ is a metal independently selected from Mg, Ca, V, Mn, Cr, Fe, Co, Ni, Cu or Zn or salt thereof, but $M^1$ is not $M^2$;

X is a value from 0.0 to 2.0; and

A is the organic linker and the modulator as described herein.

In an aspect, the metal-organic framework of general structural Formula IA also comprises solvent molecules coordinating to the metals $M^1$, $M^2$.

Moreover, the metal-organic framework of general structural Formula IA, with coordinating solvent molecules, can contain entrained solvent within the channels and pores of the material.

As noted above, the mixed-metal mixed-organic frameworks are porous crystalline materials formed of two or more distinct metal cations, clusters, or chains joined by two or more multitopic (polytopic) organic linkers. However, as described herein, the mixed-metal mixed-organic framework is also referred to as a metal-organic framework.

As used herein, generally, modulators can be any compound having a functional group capable of chelating or coordinating with a metal chain, but incapable of bridging two discrete metal chains. Exemplary modulators include, but are not limited to: carboxylates; phosphonates; sulfonates; thiols; hydroxyls; amines; and complex and polydentate chelating groups prepared from multiple functional groups such as beta-hydroxy acids and aminopolycarboxylates.

During synthesis of the present metal-organic frameworks and as described herein, modulators essentially compete with organic linkers to bind the metals which comprise the metal chains in the metal-organic framework. However, unlike the organic linkers capable of bridging metal ions, the present modulators are capable of coordinating with only a single metal chain. The inability to bridge metal chains results in the formation of localized defects in the metal-organic framework. Localized defects of the metal-organic framework can change or alter various properties, including pore size, porosity, sorption sites, and the like. Particularly, for metal-organic frameworks having channel structures that extend through the metal-organic framework, the introduction of defects by modulator inclusion can be used to increase or introduce the gap diffusion between channels, increasing gas/fluid permittivity and porosity of the metal-organic framework.

Generally, protonated and de-protonated modulators and/or a salt of such modulator can be used to synthesize the present metal-organic framework and create the metal-organic framework comprising the modulator that forms a localized defect in the metal-organic framework.

In an aspect, the modulator can be any molecule that represents (mimics) and/or competes for the binding site of the organic linker and comprises the general molecular structure denoted in the boxed region of the linker below:

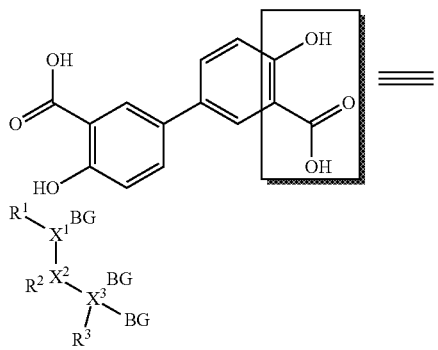

where $R^1$, $R^2$, and $R^3$ can each independently be: nothing, hydrogen, halogens, linear or branched, saturated or unsaturated carbon groups, including optionally substituted C1-C20 alkyl, optionally substituted C1-C19 heteroalkyl, optionally substituted C1-C19 alkenyl, optionally substituted C1-C19 heteroalkenyl, optionally substituted C1-C19 alkynyl, optionally substituted C1-C19 heteroalkynyl, optionally substituted C1-C19 cycloalkyl, optionally substituted C1-C19 cycloalkenyl, optionally substituted aryl, optionally substituted heterocycles, optionally substituted mixed ring systems. In an aspect, any pair of $R^1$, $R^2$, and $R^3$ can be linked together to form one or more substituted rings such as cycloalkyl, cycloalkenyl, heterocycle, aryl, bicycles, polycycles, and mixed ring systems. Ring systems can contain aromatic or non-aromatic cyclic structures containing 3 or more carbons per ring, such as five-membered or six-membered rings. $X^1$, $X^2$, and $X^3$ each independently can be carbon, silicon, nitrogen, oxygen, phosphorous, or sulfur. BG is generically anything that can make a bond to the metal of the metal-organic framework. More specifically it is sulfur, oxygen, or nitrogen. While the figure above depicts purely bonds of single bond order, it is envisioned that a functional modulator can contain bond orders greater than 1 between any of the constituents.

In another aspect, the modulator can be of the formula:

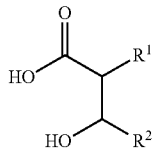

where $R^1$ and $R^2$ are independently selected from hydrogen; halides; linear or branched, saturated or unsaturated carbon groups, including optionally substituted C1-C20 alkyl, optionally substituted C1-C19 heteroalkyl, optionally substituted C1-C19 alkenyl, optionally substituted C1-C19 heteroalkenyl, optionally substituted C1-C19 alkynyl, optionally substituted C1-C19 heteroalkynyl, optionally substituted C1-C19 cycloalkyl, optionally substituted C1-C19 cycloalkenyl, optionally substituted aryl, optionally substituted heterocycles, optionally substituted mixed ring systems. In an aspect, $R^1$ and $R^2$ can be linked together to form one or more substituted rings such as cycloalkyl, cycloalkenyl, heterocycle, aryl, bicycles, polycycles, and mixed ring systems. Ring systems can contain aromatic or non-aromatic cyclic structures containing 3 or more carbons per ring, such as five-membered or six-membered rings. While the bond orders illustrated in the above formula, it is imagined that bond orders greater than 1 are possible and are explicitly captured in the definition of the term "modulator."

Exemplary modulators include organic compounds having beta-hydroxy acid-type functional groups, including aromatic and polyaromatic beta-hydroxy acids such as salicylic acid, 3-phenyl salicylic acid, 4-phenyl salicylic acid, 3-hydroxy-2-naphthoic acid, and the like; and C3 To C18 beta-hydroxy acids such as 3-hydroxypropionic acid, 3-hydroxybutyric acid, 3-hydroxy 3-methylbutyric acid, carnitine, and the like.

Modulators can include carboxylic acid/carboxylate species such as formate, acetate, propionate, butyrate, pentanate, hexanate, lactate, oxalate, citrate, pivalate, carboxylate anions of amino acids, and the like; chelators such as aconitic acid, alanine diacetic acid (ADA), alkoyl ethylene diamine triacetic acids (e.g., lauroyl ethylene diamine triacetic acids (LED3A)), aminotri (methylenephosphonic acid) (ATMP), asparticaciddiacetic acid (ASDA), asparticacidmonoacetic acid, diamino cyclohexane tetraacetic acid (CDTA), citraconic acid, citric acid, 1,2-diaminopropanetetraacetic acid (DPTA-OH), 1,3-diamino-2-propanoltetraacetic acid (DTPA), diethanolamine, diethanol glycine (DEG), diethylenetriaminepentaacetic acid (DTPA), diethylene triamine pentamethylene phosphonic acid (DTPMP), diglycolic acid, dipicolinic acid (DPA), ethanolaminediacetic acid, ethanoldiglycine (EDG), ethionine, ethylenediamine (EDA), ethylenediaminediglutaric acid (EDDG), ethylenediaminedi(hydroxyphenylacetic acid (EDDHA), ethylenediaminedipropionic acid (EDDP), ethylenediaminedisuccinate (EDDS), ethylenediaminemonosuccinic acid (EDMS), ethylenediaminetetraacetic acid (EDTA), ethylenediaminetetrapropionic acid (EDTP), ethyleneglycolaminoethylestertetraacetic acid (EGTA), gallic acid, glucoheptonic acid, gluconic acid, glutamicaciddiacetic acid (GLDA), glutaric acid, glyceryliminodiacetic acid, glycinamidedisuccinic acid (GADS), glycoletherdiaminetetraacetic acid (GEDTA), 2-hydroxyethyldiacetic acid, hydroxyethylenediaminetriacetic acid (HEDTA), hydroxyethyldiphosphonic acid (HEDP), 2-hydroxyethyl imino diacetic acid (HIMDA), hydroxyiminodiacetic acid (HIDA), 2-hydroxy propylene diamine disuccinic acid (HPDDS), iminodiacetic acid (IDA), iminodisuccinic acid (IDS), itaconic acid, lauroyl ethylene diamine triacetic acids (LED3A), malic acid, malonic acid, methylglycinediacetate (MGDA), methyliminodiacetic acid (MIDA), monoethanolamine, nitrilotriacetic acid (NTA), nitrilotripropionic acid (NPA), N-phosphonomethyl glycine (glyphosate), propyldiamine tetraacetic acid (PDTA), salicylic acid, serinediacetic acid (SDA), sorbic acid, succinic acid, sugars, tartaric acid, tartronic acid, triethanolamine, triethylenetetraamine, triethylene tetraamine hexaacetic acid (TTHA), and combinations thereof. Other exemplary modulators are identified in US Publication No. 2017/0081345 at ¶¶ [0108] to [0112], incorporated herein by reference.

Furthermore, the present metal-organic framework can be appended with amine molecules, referred to herein as "ligand," that enables a step-shaped isotherm. The step-shaped isotherm occurs upon the insertion of the $CO_2$ into the metal-amine coordination bond, in turn creating a negative charge to localize on the oxygen of the $CO_2$. Diamines (molecules containing two amines) enable an amine to be bound to the metal, and a second amine to be positioned down the channel of the metal-organic framework. Upon insertion of $CO_2$, the second amine accepts a proton, and thereby becomes positively charged, balancing the negative charge on the oxygen.

In an aspect, the metal-organic framework system (sometimes referred to as "an appended metal-organic framework" or "an appended mixed-metal-organic framework") is represented by Formula II $$M^1{}_xM^2{}_{(2-x)}(A)(B) \qquad II$$

wherein $M^1$ is independently selected from the group consisting of Mg, Ca, V, Mn, Cr, Fe, Co, Ni, Cu and Zn;

$M^2$ is independently selected from the group consisting of Mg, Ca, V, Mn, Cr, Fe, Co, Ni, Cu and Zn, and $M^1$ is not $M^2$;

X is a value from 0.00 to 2.0;

A is the linker and the modular as described herein; and

B is a ligand containing one or more groups capable of functioning as suitable Lewis base (electron donor) such as oxygen, phosphorus or sulfur or an amine having 1 to 10 amine groups.

Moreover, the metal-organic framework of general structural Formula II, with coordinating solvent molecules, can contain entrained solvent within the channels and pores of the material.

Ligands suitable for use in the metal-organic framework systems can have (at least) two functional groups: 1) A functional group used to bind CO$_2$ and 2) a functional group used to bind the metal. The second functional group that binds the metal can also be an amine. It is possible to use other functional groups such as oxygen containing groups like alcohols, ethers or alkoxides, carbon groups like carbenes or unsaturated bonds like alkenes or alkynes, or sulfur atoms.

Similarly, triamines can be used as the ligand appended to the metal frameworks provided herein. However, the triamine may not efficiently facilitate cooperative insertion of CO$_2$. On the other hand, tetramines (molecules having four amines) could accommodate two amines binding to the metal sites, creating the binding site for CO$_2$, while the other two amines were available to provide charge balance upon CO$_2$ insertion. Additionally, inclusion of tetramines can allow for each amine molecule to be bound more strongly to the metal-organic framework (two amines binding to two metals per molecule, rather than one amine per molecule), providing some improvement in stability. Commercially available tetramines, as well as some other suitable amines are provided below:

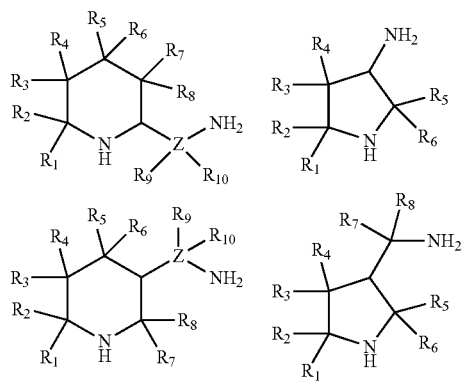

In addition, with the present metal-organic frameworks, the ligand does not have to be an amine, but can be any Lewis base (electron donor) including various other atomic alternatives such as oxygen, phosphorus, or sulfur.

In an aspect, B is a ligand selected from the group consisting of:

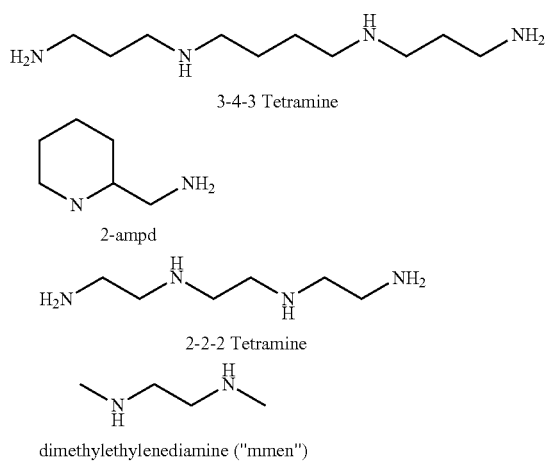

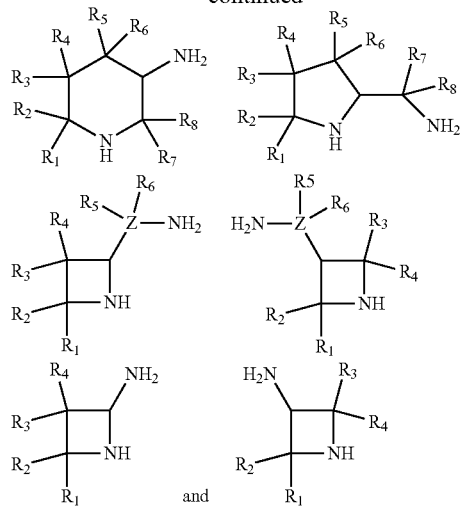

wherein Z is carbon, silicon, germanium, sulfur, or selenium, and R$_1$, R$_2$, R$_3$, R$_4$, R$_5$, R$_6$, R$_7$, R$_8$, R$_9$, and R$_{10}$ are each independently selected from H, halogen, methyl, halogen substituted methyl, and hydroxyl. In an aspect, R$_1$, R$_2$, R$_3$, R$_4$, R$_5$, R$_6$, R$_7$, R$_8$, R$_9$, and R$_{10}$ R1, R2, R3, R4, R5, R6, R7, R8, R9, and R10 are each H and Z is carbon.

In an aspect, the ligand is 2-(aminomethyl)-piperidine (2-ampd).

As provided herein, Formula I can include a solvent molecule coordinating to the metal sites, such as, $M^1_xM^2_{(2-x)}$(DOBPDC)(solvent)$_2$. As synthesized in the protocol described below, an exemplary solvent is N,N-Dimethylformamide (DMF). The solvent molecule can be removed by heating under vacuum, thereby generating an "activated" mixed-metal-organic framework. Alternatively, the DMF (or other solvent molecule such as water, methanol, . . . ) can be displaced by treating the mixed-metal-organic framework with the amine. This is referred to as an "appended" mixed-metal-organic framework, or a mixed-metal mixed-organic framework system, and is the material that binds CO$_2$. For example, the mixed-metal mixed-organic framework, amine ("2-ampd") will yield an exemplary Formula II, $M^1_xM^2_{(2-x)}$(DOBPDC)(2-ampd)$_2$, referred to as $M^1_xM^2_{(2-x)}$-EMM-44.

Thus, Formula I, $M^1_xM^2_{(2-x)}$A can include solvent-bound mixed-metal-organic frameworks such as $M^1_xM^2_{(2-x)}$(DOBPDC)(DMF)$_2$ and be inactive or activated. On the other hand, Formula II, $M^1_xM^2_{(2-x)}$AB refers to a mixed-metal mixed-organic framework system.

As described herein, the metal-organic frameworks are porous crystalline materials formed of one or more distinct metal cations, clusters, or chains joined by two or more multitopic (polytopic) organic linkers.

As such, a mixed-metal mixed-organic framework (also referred to more generally herein as a "metal-organic framework") can also be represented by Formula III, $M^1_xM^2_{(2-x)}$ $(A^1_aA^2_bA^3_c \ldots A^n_{(1-a-b-c-)})$ (III) wherein $A^1$ is a multitopic organic linker and $A^2$ is a multitopic organic linker dissimilar to $A^1$ and $A^3$ is a multitopic organic linker dissimilar to $A^1$ and $A^2$; and $A^n$ is a multitopic organic linker dissimilar to $A^1, A^2 \ldots$ and $A^{(n-1)}$.

In an aspect, the metal-organic framework of general structural Formula III also comprises solvent molecules coordinating to the metals $M^1$, $M^2$.

Moreover, the metal-organic framework of general structural Formula III, with coordinating solvent molecules, can contain entrained solvent within the channels and pores of the material.

In an aspect, ligands providing the metal-organic framework system can contain other structural elements used to coordinate the ligand to one or more metals of the framework system, including but not limited to, the following functional groups: carboxylate, triazolate, pyrazolate, tetrazolate, pyridines, amines, alkoxide and/or sulfate groups.

As described in the Examples, the present metal-organic framework systems can be prepared in a two-step process shown in scheme 1 as follows:

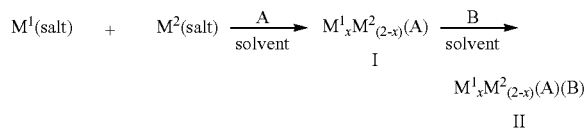

In step 1, a suitable salt of $M^1$ and a suitable salt of $M^2$ are combined with a mixture A containing one or more organic linkers and/or one or more modulators in an appropriate solvent and heated to provide the metal-organic framework system generally represented by Formula I. By way of example, a magnesium salt is combined with a mixture of 4,4'-dioxidobiphenyl-3,3'-dicarboxylate ($H_4$DOBPDC) and salicylic acid to provide the MOF having a composition of Formula I, where $M^1$ is magnesium, x is 2, and A is a combination of linker, DOBPDC and modulator, salicylic acid forming localized defects in the MOF.

In step 2, the metal-organic framework is combined with a ligand in a suitable solvent. By way of example, the metal-organic framework is combined with 2-(aminomethyl)piperidine (2-ampd) in toluene to provide the metal-organic framework system having the composition of Formula II, where $M^1$ is magnesium, x is 2, A is DOBPDC and salicylic acid, and B 2-ampd.

In an aspect, a metal-organic framework prepared from the reaction of a metal (or metals) with one or more organic linkers may be modified post-synthesis through solvent-mediated exchange with one or more modulators. This method, referred to in the literature as Solvent Assisted Ligand Exchange (SALE) or Post-Synthetic Exchange (PSE), is discussed by, for example, Karagiaridi, O.; Bury, W.; Mondloch, J. E.; Hupp, J. T.; Farha, O. K. in "Solvent-Assisted Linker Exchange: An Alternative to the De Novo Synthesis of Unattainable Metal-Organic Frameworks", Angew. Chem. Int. Ed. 2014, 53, 4530-4540).

In post-synthesis modification, a liquid medium containing one or more modulators (and possibly additional or different organic linkers) is contacted with a prepared metal-organic framework and reacted to exchange a portion of the organic linkers with the subsequently added modulator. In an aspect, the functionality of the modulator or second organic linker may be the same or different from the first organic linker.

In an aspect, the present metal-organic frameworks comprising a localized defect incorporate one or more modulators at a percent by atomic composition (mol %) of the metal-organic framework of up to 15 mol %, 20 mol %, or 30 mol %. In an aspect, the one or more modulators in the metal-organic framework are present by the atomic composition (mol %) of the metal-organic framework at one of the following lower limits of about: 0.1 mol %; 0.5 mol %; 1.5 mol %; 2 mol %; 2.5 mol %; 3.0 mol %; 3.5 mol %; 4.0 mol %; 4.5 mol %; 5 mol %; 5.5 mol %; 6.0 mol %; 6.5 mol %; and 7.0 mol %. In an aspect, the one or more modulators in the metal-organic framework are present by the atomic composition (mol %) of the metal-organic framework at one of the following upper limits of about: 10 mol %; 12 mol %; 15 mol %; 18 mol %; 20 mol %; 22 mol %; 25 mol %; 28 mol %; and 30 mol %.

In an aspect, the present metal-organic framework comprises a derivative of 3-hydroxypropionic acid at a percent by atomic composition (mol %) of the metal-organic framework between about 5 mol % to about 15 mol %. The derivative as attached to the framework could be, but is not limited to, a singly- or doubly-deprotonated form of 3-hydroxypropionic acid or the combination thereof, though the disclosure is not limited to this specific form.

In an aspect, the present metal-organic framework comprises a derivative of salicylic acid at a percent by atomic composition (mol %) of the metal-organic framework between about 5 mol % to about 25 mol %. The derivative as attached to the framework could be, but is not limited to, a singly- or doubly-deprotonated form of salicylic acid or the combination thereof, though the disclosure is not limited to this specific form.

Also, provided herein are adsorption materials. The present adsorption material comprises the present metal-organic frameworks containing localized defects. The metal-organic framework comprises two or more metals and a plurality of organic linkers and a plurality of modulators. The adsorption material further comprises a plurality of ligands. In an aspect, each respective ligand in the plurality of ligands is an amine or other Lewis base (electron donor) such as oxygen, phosphorus or sulfur appended to a metal ion of two or more distinct elements and the metal-organic framework to provide a metal-organic framework system.

The present metal-organic framework systems represent a class of porous, crystalline adsorbents that enables greater functionality with reduced adsorbent mass and volume compared to traditional solid adsorbents. The present metal-organic framework system has coordinatively unsaturated metal centers (open metal sites) along the pore surfaces. The metal cations behave as Lewis acids that strongly polarize gas adsorbents and are further amenable to post-synthetic functionalization. In the metal-organic framework system having well separated open metal sites, one amine of a diamine ligand molecule can bind to a metal cation as a Lewis base while the second amine remains available as a chemically reactive adsorption site. The metals in the metal-organic framework system can be individual metal atoms bridged by a set of ligands, metal chains, or metal clusters (a collection of metal atoms that as a group interact with a set of ligands).

Some or all ligands of the metal-organic framework system include functional groups that are not coordinated to metal cations and are available to form reversible weak chemical bonds with $CO_2$. The reactive chemical atom can contain a lone pair of electrons including nitrogen, oxygen, sulfur, and phosphorous. In an aspect, this is a basic amine.

Carbon Dioxide Applications

As described herein, a metal-organic framework that contains more than one metal species of ions (a "cluster" or "chain") is later functionalized (or appended) with a diamine ligand (a "ligand") to provide a metal-organic framework system. The present metal-organic framework systems are useful as adsorbent or adsorbent material of $CO_2$ in various applications and emission streams. Each novel metal-organic framework described herein can, but does not necessarily have to, contain more than one metal species. The metal-organic framework can be prepared from multiple metal sources and is appended by one or more organic ligand such as an amine to provide the metal-organic framework system. The metal-organic framework system displays a Type-V isotherm. By varying the ratio of metals incorporated in the metal-organic framework, a position of the step in the isotherm can be varied as a function of $CO_2$ partial pressure.

For example, in an aspect, the metal-organic framework can be later functionalized with the amine 2-ampd to provide the metal-organic framework system, EMM-44. This metal-organic framework system can reversibly and selectively bind to $CO_2$ and can be regenerated for repeat use by mild heating or by exposing to vacuum.

As described in U.S. Pat. No. 9,861,953, Alkylamine Functionalized Metal-Organic Frameworks for Composite Gas Separations, a metal-organic framework, MOF-274, is taught. This framework can be synthesized from individual metal precursors capable of advantageous Type-V isotherms for CO2 capture, but are not a metal-organic framework as provided herein. Generally, adsorbent materials displaying a Type-V isotherm possess a greater working capacity than adsorbents having a similar overall adsorption capacity but also possess the more common type-I isotherm. Other such frameworks are described in J. Am. Chem. Soc, 2012, 134, 7056-7065, Nature, 2015, 519, 303-308, J. Am. Chem. Soc, 2017, 139, 10526-10538, J. Am. Chem. Soc. 2017, 139, 13541-13553, and Chem Sci, 2018, 9, 160.

Methods of use for the present adsorption materials include a variety of gas separation and manipulation applications including the isolation of individual gases from a stream of combined gases, such as carbon dioxide/nitrogen, carbon dioxide/hydrogen, carbon dioxide/methane, carbon dioxide/oxygen, carbon monoxide/nitrogen, carbon monoxide/methane, carbon monoxide/hydrogen, hydrogen sulfide/methane and hydrogen sulfide/nitrogen.

Among the primary benefits of physiorption onto solid materials is the low regeneration energy compared to that required for aqueous amines. However, this benefit frequently comes at the expense of low capacity and poor selectivity. The present systems provide adsorbents (adsorbent materials) that can bridge the two approaches through the incorporation of sites that bind CO2 by chemisorption onto solid materials. These adsorption materials may eliminate the need for aqueous solvents, and may have significantly lower regeneration costs compared with traditional amine scrubbers, yet maintain their exceptional selectivity and high capacity for $CO_2$ at low pressures.

Generally, metal-organic frameworks are porous, crystalline solids subsequently functionalized with the incorporation of alkylamines. Similarly, the metal-organic frameworks provided herein are porous, crystalline solids that are subsequently functionalized with the incorporation of alkylamines to exhibit enhanced basicity over aromatic amines, and are capable of adsorbing acid gases.

In an aspect, the metal-organic framework system can separate gases at low temperatures and pressures. The metal-organic framework systems are useful for pre-combustion separation of carbon dioxide and hydrogen and methane from a stream of gases and for separation of carbon dioxide from a stream of post-combustion flue gases at low pressures and concentrations. The metal-organic framework can be adapted to many different separation needs.

More specifically, in an aspect of the present disclosure, there are a number of technical applications for the disclosed adsorption materials. One such application is carbon capture from coal flue gas or natural gas flue gas. The increasing atmospheric levels of carbon dioxide ($CO_2$), which are contributing to global climate change, warrant new strategies for reducing $CO_2$ emissions from point sources such as power plants. In particular, coal-fueled power plants are responsible for 30-40% of global $CO_2$ emissions. See, Quadrelli et al., 2007, "The energy-climate challenge: Recent trends in $CO_2$ emissions from fuel combustion," Energy Policy 35, pp. 5938-5952, which is hereby incorporated by reference. Thus, there remains a continuing need for the development of new adsorbents for carbon capture from coal flue gas, a gas stream consisting of $CO_2$ (15-16%), 02 (3-4%), $H_2O$ (5-7%), $N_2$ (70-75%), and trace impurities (e.g. $SO_2$, $NO_x$) at ambient pressure and 40° C. See, Planas et al., 2013, "The Mechanism of Carbon Dioxide Adsorption in an Alkylamine-Functionalized Metal-organic Framework," J. Am. Chem. Soc. 135, pp. 7402-7405, which is hereby incorporated by reference. Similarly, growing use of natural gas as a fuel source necessitates the need for adsorbents capable of $CO_2$ capture from the flue gas of natural gas-fired power plants. Flue gas produced from the combustion of natural gas contains lower $CO_2$ concentrations of approximately 4-10% $CO_2$, with the remainder of the stream consisting of $H_2O$ (saturated), 02 (4-12%), and $N_2$ (balance). In particular, for a temperature swing adsorption process an adsorbent should possess the following properties: (a) a high working capacity with a minimal temperature swing, in order to minimize regeneration energy costs; (b) high selectivity for $CO_2$ over the other constituents of coal flue gas; (c) 90% capture of $CO_2$ under flue gas conditions; (d) effective performance under humid conditions; and (d) long-term stability to adsorption/desorption cycling under humid conditions.

Another such application is carbon capture from crude biogas. Biogas, the $CO_2/CH_4$ mixtures produced by the breakdown of organic matter, is a renewable fuel source with the potential to replace traditional fossil fuel sources. Removal of $CO_2$ from the crude biogas mixtures is one of the most challenging aspects of upgrading this promising fuel source to pipeline quality methane. Therefore, the use of adsorbents to selectively remove $CO_2$ from $CO_2/CH_4$ mixtures with a high working capacity and minimal regeneration energy has the potential to greatly reduce the cost of using biogas in place of natural gas for applications in the energy sector.

The disclosed compositions (adsorption materials) can be used to strip a major portion of the $CO_2$ from the $CO_2$-rich gas stream, and the adsorption material enriched for $CO_2$ can be stripped of $CO_2$ using a temperature swing adsorption method, a pressure swing adsorption method, a vacuum swing adsorption method, a concentration swing adsorption method, or a combination thereof. Example temperature swing adsorption methods and vacuum swing adsorption methods are disclosed in International Publication Number WO2013/059527 A1.

Isosteric heat of adsorption calculations provide an indicator of the strength of the interaction between an adsorbate and adsorbent, specifically determined from analysis of adsorption isotherms performed across a series of different temperatures. *J. Phys. Chem. B,* 1999, 103, 6539-6545; *Langmuir,* 2013, 29, 10416-10422. Differential scanning calorimetry is a technique which measures the amount of energy released or absorbed as a parameter (such as temperature or $CO_2$ pressure) varies.

In the following examples metal-organic frameworks having localized defects were prepared and characterized.

Characterization of MOF-274 Systems
Powder X-Ray Diffraction (PXRD).

Metal-organic frameworks were suspended in methanol by thorough mixing and sonication, then drop-cast onto a zero-background cell. Powder x-ray diffraction data were collected on a Bruker D8 Endeavor instrument with the x-ray generator running at 45 kV/40 mA and an opening degree of 0.02 collecting the spectrum between 4-50 two-theta for 10 minutes. As shown in FIG. 1, powder x-ray diffraction pattern of representative MOF-274 are shown. Samples 1 through 5 are different batches of the same material where the amine was not appended, and the framework has not been functionalized or activated.

Characterization of Defects

The presence of localized defects in the metal-organic frameworks presented herein are characterized by the presence of the modulator through magic angle spinning (MAS) nuclear magnetic resonance (NMR) of the defected materials as described in *Eur. J. Inorg. Chem.* 2016, 2017-2024. Solution-state NMR of the digested materials as described in example 1 can also effectively probe the presence of the modulators/defects. In addition to probing defects through composition, the effect of the presence of these defects can also be observed in the anisotropic diffusion of $CO_2$ as measured by pulsed field gradient (PFG) NMR, detailed in *J. Am. Chem. Soc.* 2018, 140, 5, 1663-1673.

Thermal Gravimetric Analysis ("TGA")

TGA analysis records the response of a material's weight as a function of temperature under 1 atmosphere of dry air. TGA curves were recorded on a TA Q500 thermal analysis system under nitrogen flow.

Scanning Electron Microscope ("SEM")

SEM images provide pictures of the bulk material shape, morphology, and a qualitative appraisal of material polydispersity. Images were collected on a Hitachi SEM at 2 keV acceleration using the upper detector.

Example I

Preparation of the Metal-Organic Framework MOF-274 with Localized Defects Using Salicylic Acid A vessel containing a sparged solution of 33 mL methanol and 27 mL DMF is charged with 2.328 g (9.08 mmol) $Mg(NO_3)_2.6H_2O$ and 2 g (7.3 mmol) $H_4DOBPDC$. The solution is stirred until full dissolution, then 15 mL of this solution is transferred into each of three 23-mL Teflon-lined autoclaves. To each autoclave 78, 31, or 16 mg salicylic acid (0.25 eq, 0.1 eq, 0.05 eq, respectively) are added and stirred until fully dissolved. The reactors are sealed and heated to 120° C. for 96 hours.

Figure 2A:
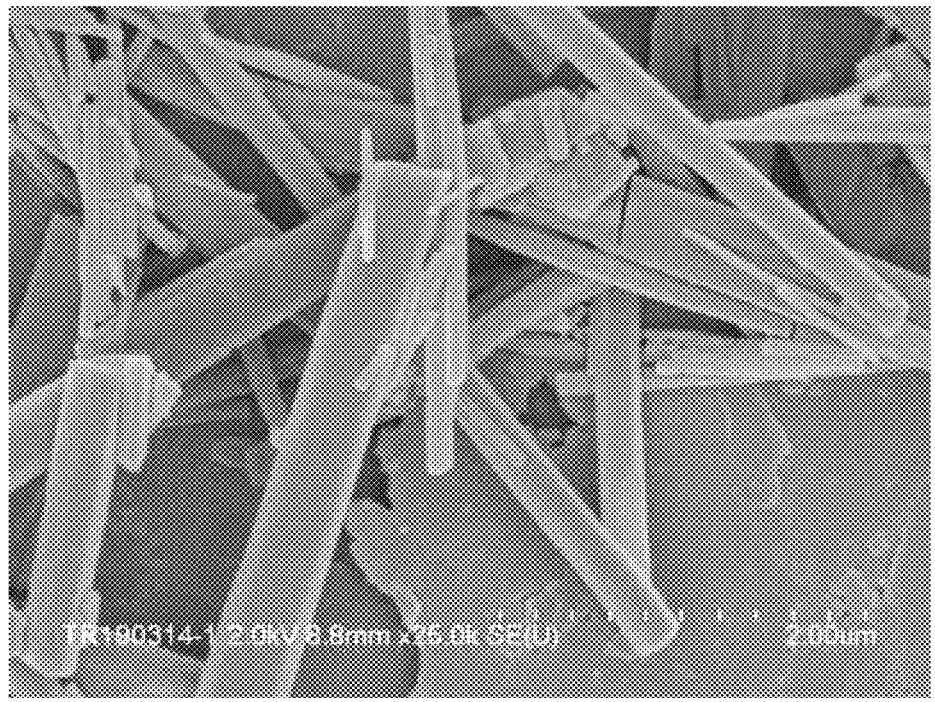
FIGS. 2A and 2B are SEM images of MOF-274 containing with 25% salicylic acid.
Figure 2B:
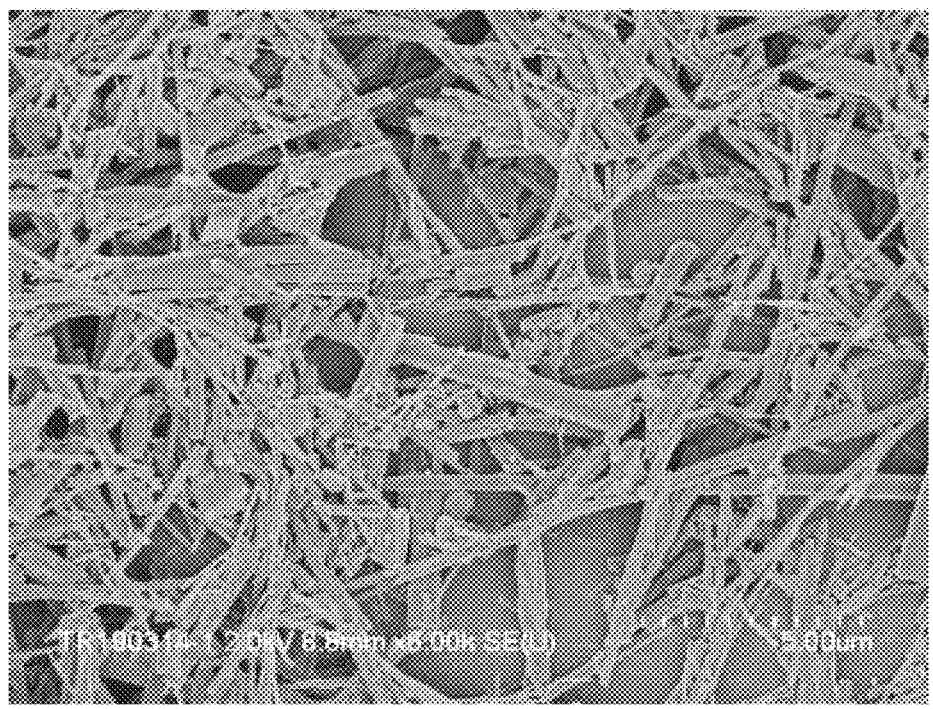
Figure 3A:
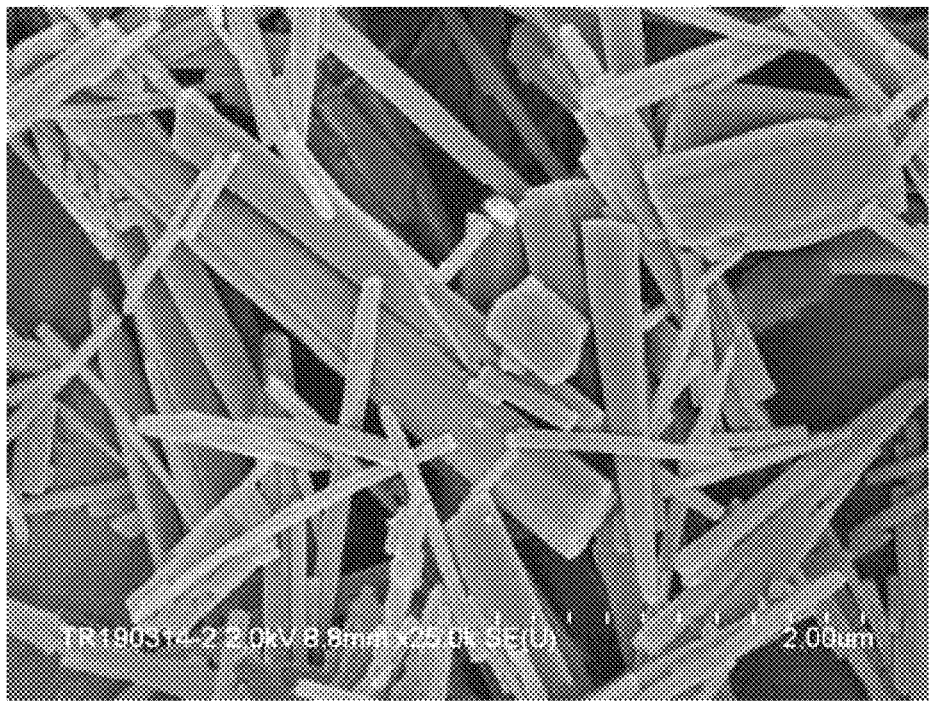
FIGS. 3A and 3B are SEM images of MOF-274 containing with 10% salicylic acid.
Figure 3B:
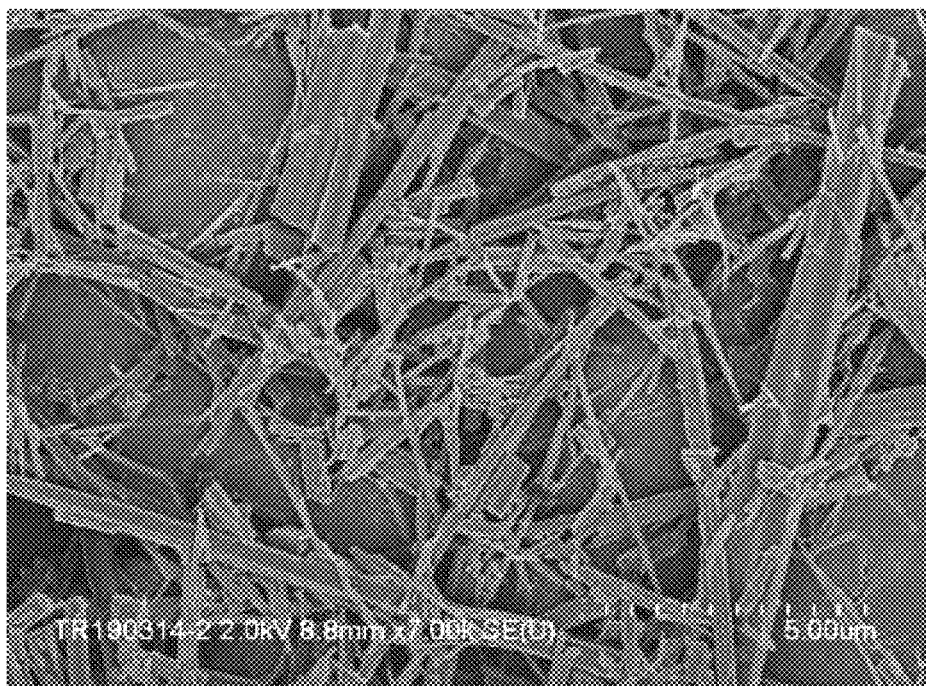
Figure 4A:
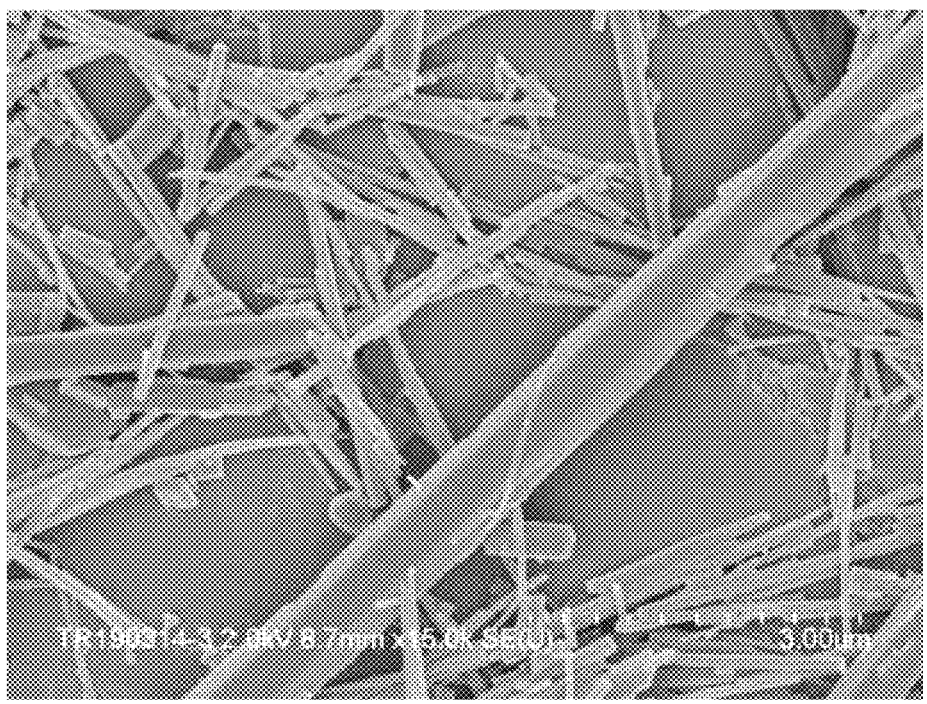
FIGS. 4A and 4B are SEM images of MOF-274 containing 5% salicylic acid.
Figure 4B:
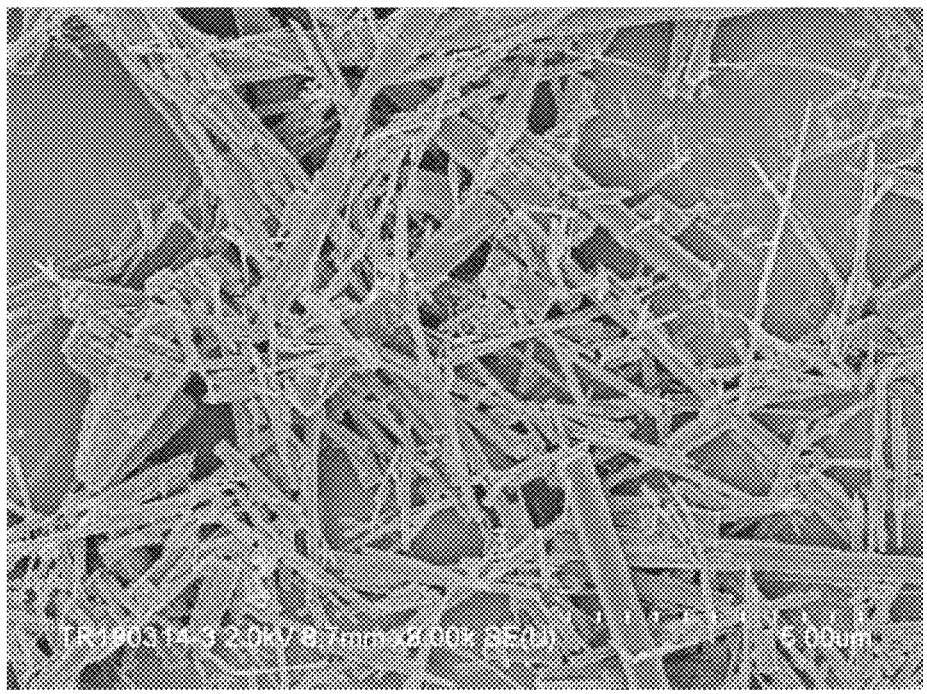
Figure 5:
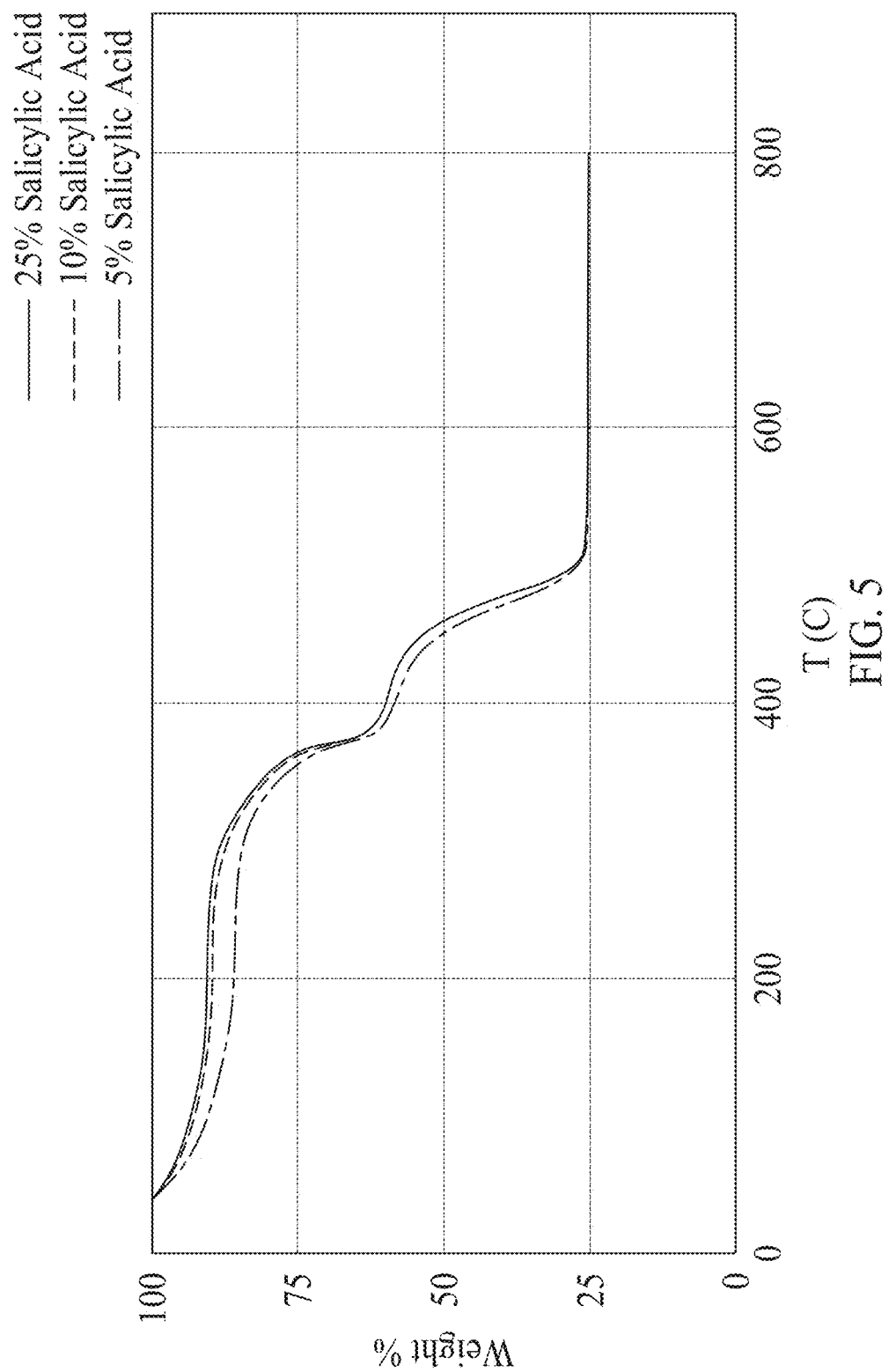
FIG. 5 is a thermogravimetric analysis ("TGA") profile for MOF-274 containing 5-25% salicylic acid.

The metal-organic frameworks generated in Example 1 were characterized through a variety of techniques, and demonstrated good crystallinity by powder x-ray diffraction ("PXRD") in FIG. 1. Samples of MOF-247 treated with salicylic acid exhibited blocky rod-shaped crystalline morphology as shown in FIGS. 2A and 2B for samples treated with 25% concentration, in FIGS. 3A and 3B for samples treated with 10% concentration, and in FIGS. 4A and 4B for samples treated with 5% concentration. Samples were also characterized by TGA as indicated by the decomposition profiles shown in FIG. 5.

Figure 6:
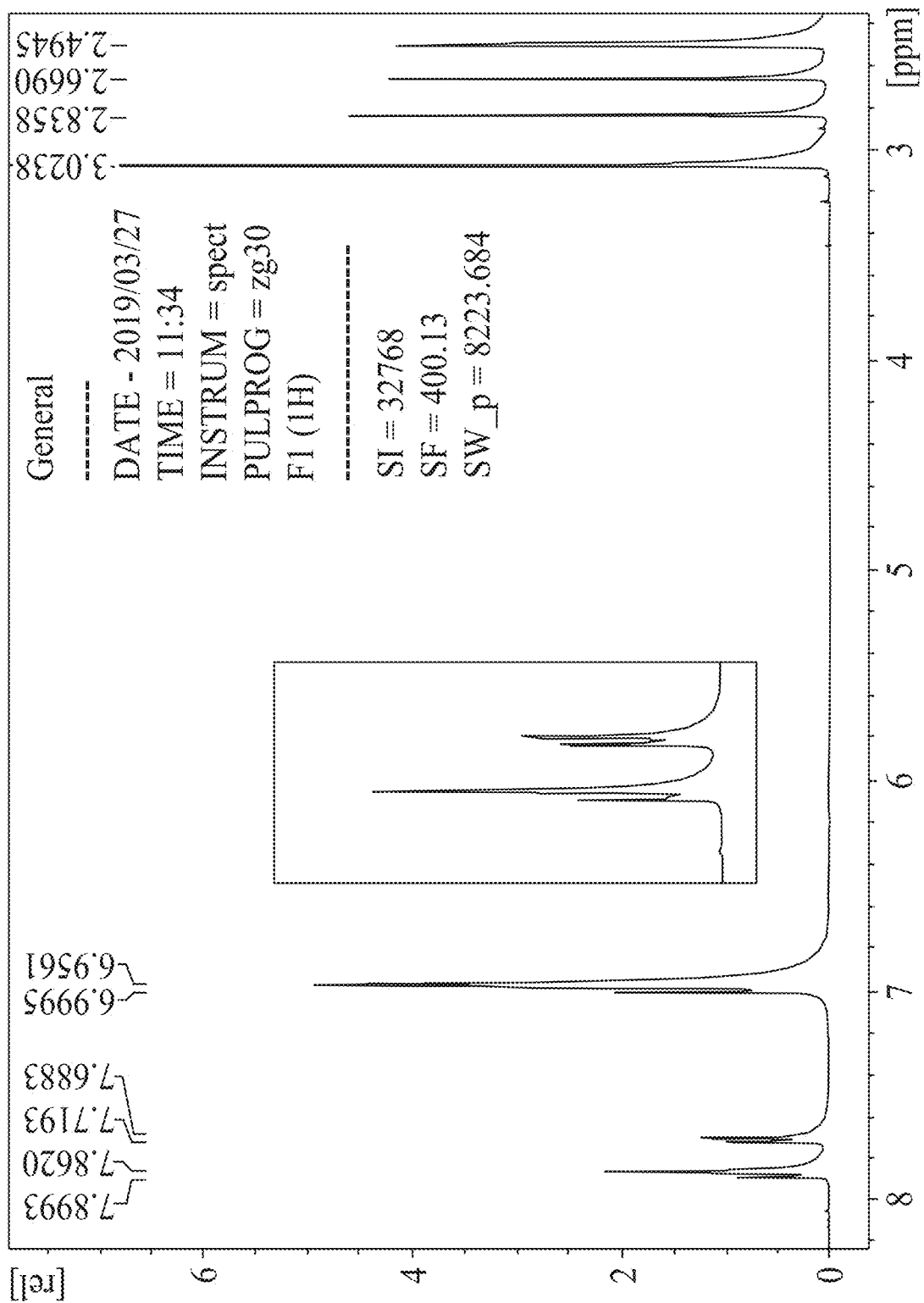
FIG. 6 is a graphical depiction of $^1$H NMR of MOF-274 synthesized with 25% salicylic acid.
Figure 7:
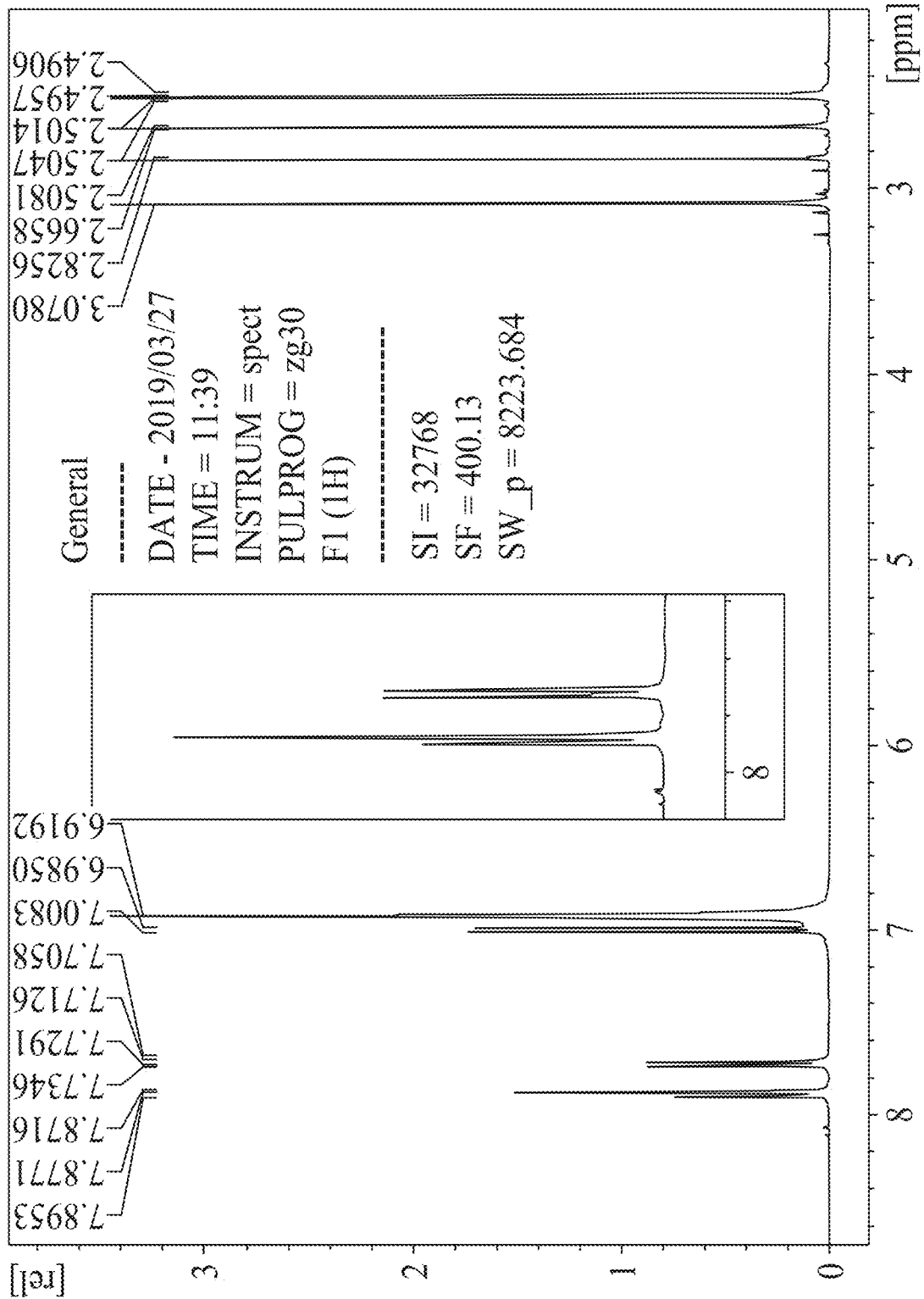
FIG. 7 is a graphical depiction of $^1$H NMR of MOF-274 synthesized with 10% salicylic acid.
Figure 8:
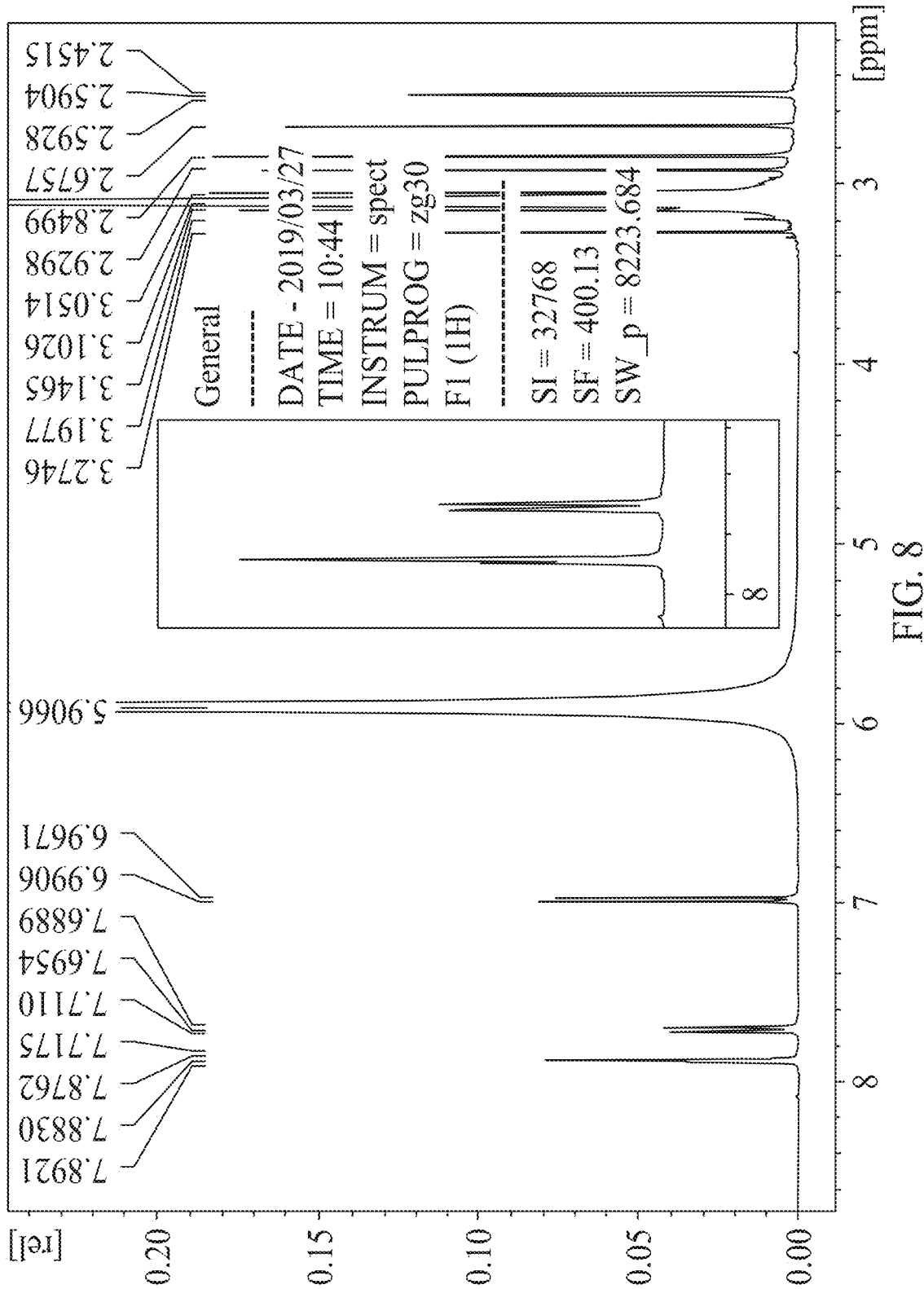
FIG. 8 is a graphical depiction of $^1$H NMR of MOF-274 synthesized with 5% salicylic acid.

Confirmation of modulator incorporation and a localized defect was achieved by digesting samples of the MOF-274 in DMSO with 1-2 drops of DCl in $D_2O$, then collecting 1H NMR spectra and normalizing the peak area integrations for the incorporated modulator by the peaks attributable to the ligand in the metal-organic framework. Due to the molecular similarity of salicylic acid with $H_4DOBPDC$, the 1H NMR spectra are challenging to resolve, with the characteristic feature observed at approximately 7.89 ppm and almost superpositioned with a peak from the organic linker at 7.86 ppm. The data is displayed in FIGS. 6 to 8 with the insets showing the peaks at 7.89 and 7.86 ppm.

Example 2

Preparation of the Metal-Organic Framework MOF-274 with Localized Defects Using 3-Hydroxypropionic Acid A vessel containing a sparged solution of 20 mL water, 16 mL THF, and 15.5 mL acetonitrile is charged with 269 mg (1.05 mmol) $Mg(NO_3)_2.6H_2O$, 115 mg (0.42 mmol) 4,4'-dihydroxy-[1,1'-biphenyl]-3,3'-dicarboxylic acid ($H_4DOBPDC$), and 971.25 mg (4.2 mmol) 3-(N-Morpholino)propanesulfonic acid sodium salt (Na MOPS). The solution is stirred until full dissolution, then 6 mL is aliquoted into 10-mL Teflon-lined autoclaves. To each autoclave, 2.3 µL (0.05 eq) to 45.4 µL (1 eq) of a 30 mol % 3-hydroxypropionic acid solution is added, producing samples having concentrations (by volume) of 5%, 10%, and 25% of 3-hydroxypropionic acid, respectively. The reactors are sealed and heated at 120 C for 24 hours.

Figure 9:
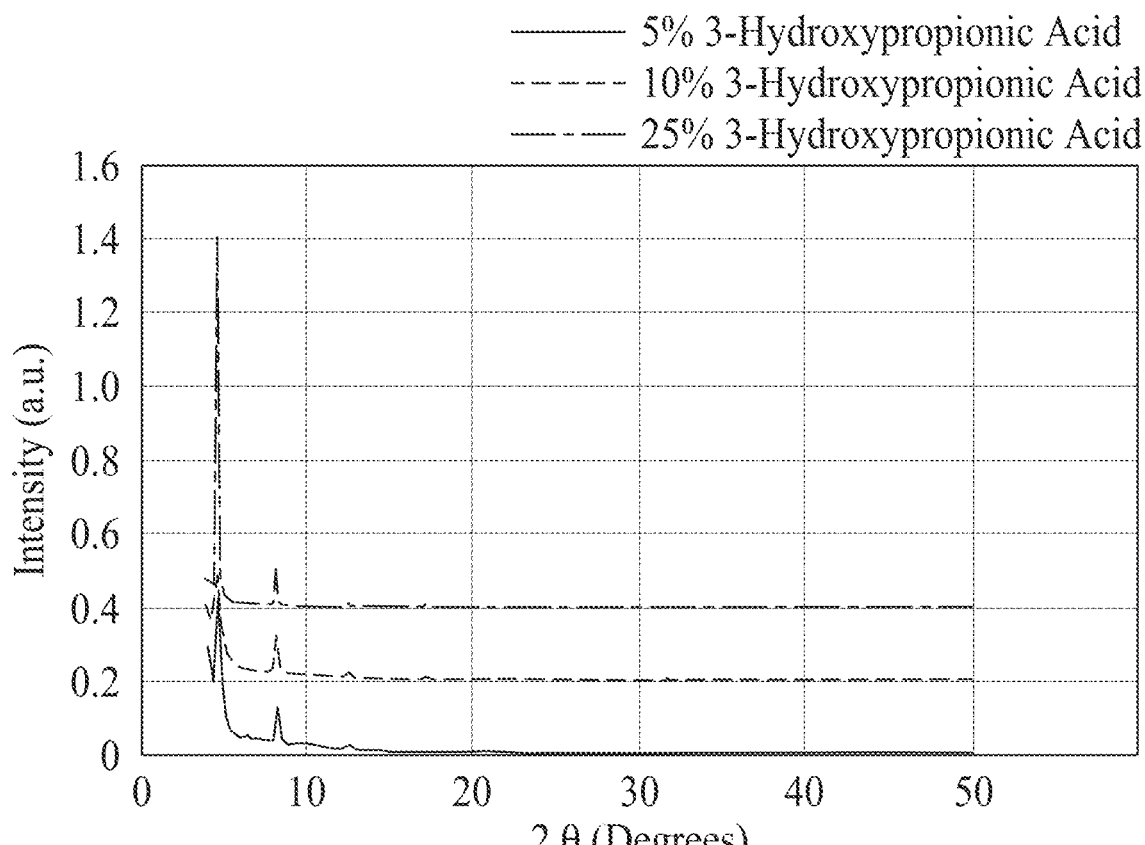
FIG. 9 is a graphical representation of PXRD spectra for MOF-274 samples containing 5-25% 3-hydroxypropionic acid.

The metal-organic frameworks generated were characterized through a variety of techniques, and demonstrated good crystallinity by powder x-ray diffraction (PXRD) in FIG. 9.

Figure 10:
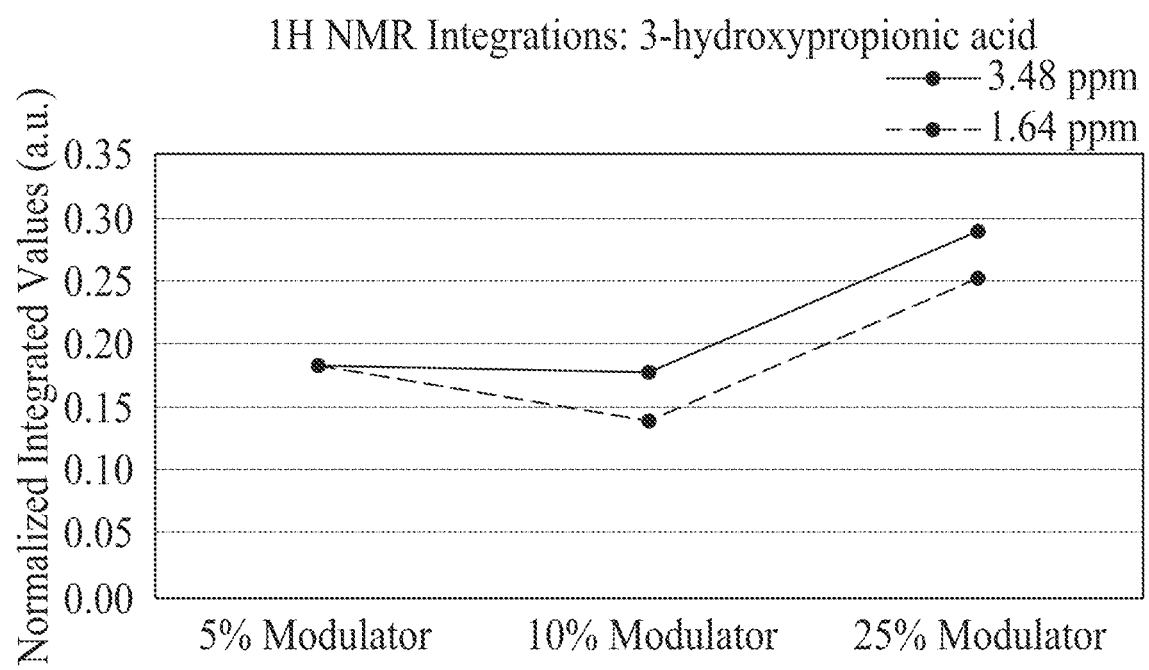
FIG. 10 is a graphical representation of percent integration as a function of $^1$H NMR integration for MOF-274 containing 5-25% 3-hydroxypropionic acid modulator.
Figure 11:
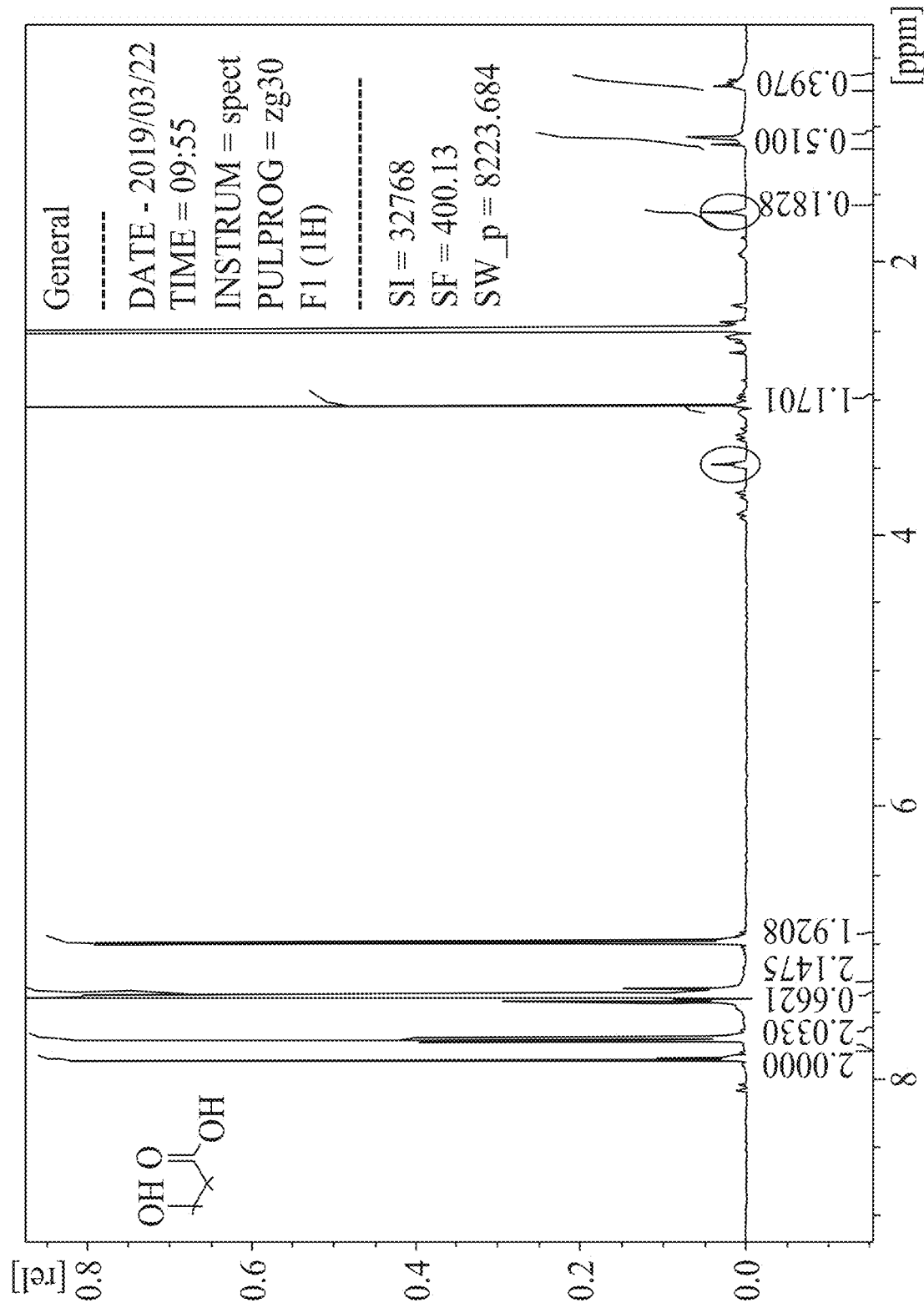
FIG. 11 is a graphical depiction of $^1$H NMR spectrum of digested MOF-274 prepared with 5% 3-hydroxypropionic acid.
Figure 12:
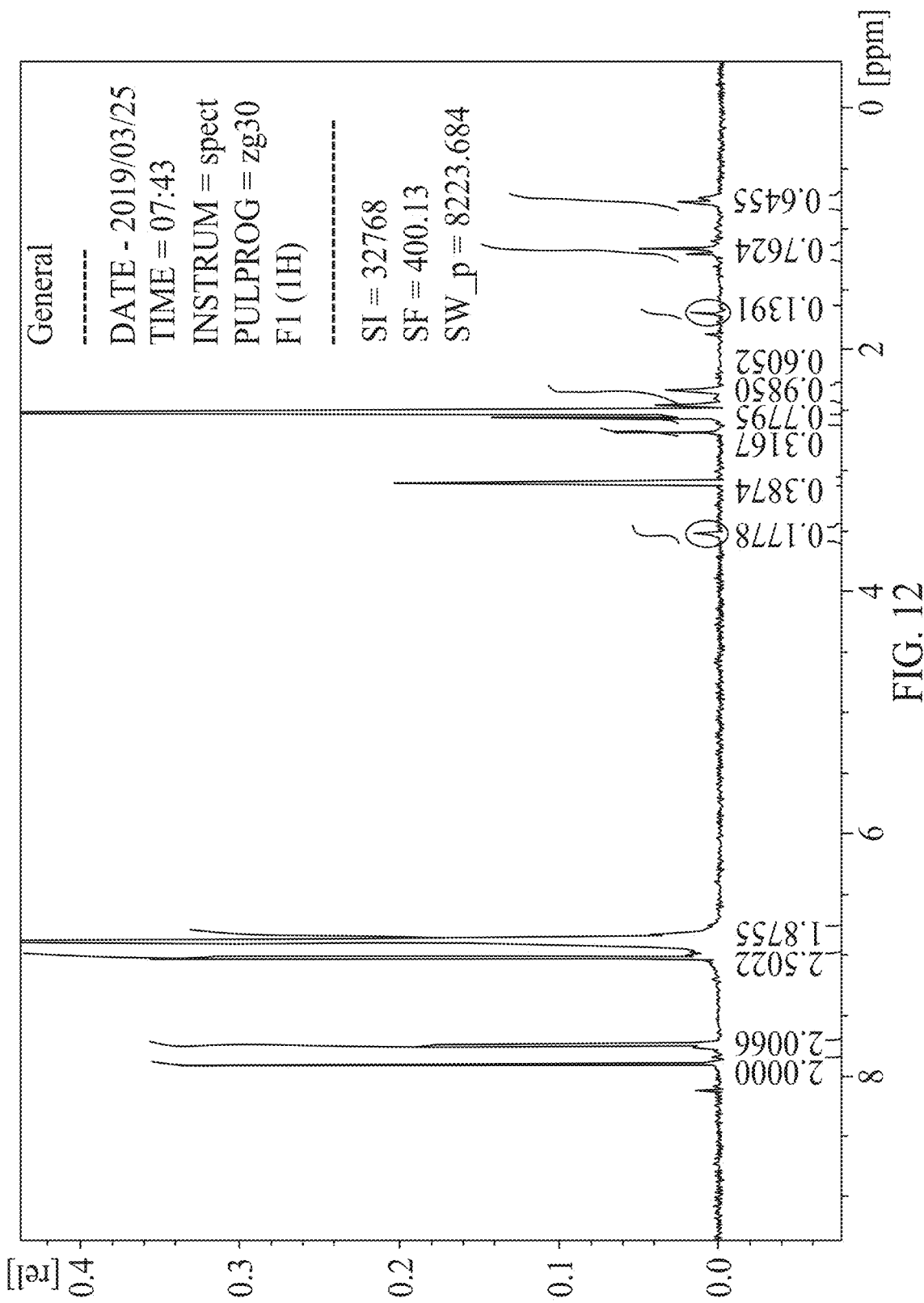
FIG. 12 is a graphical depiction of $^1$H NMR spectrum of digested MOF-274 prepared with 5% 3-hydroxypropionic acid.
Figure 13:
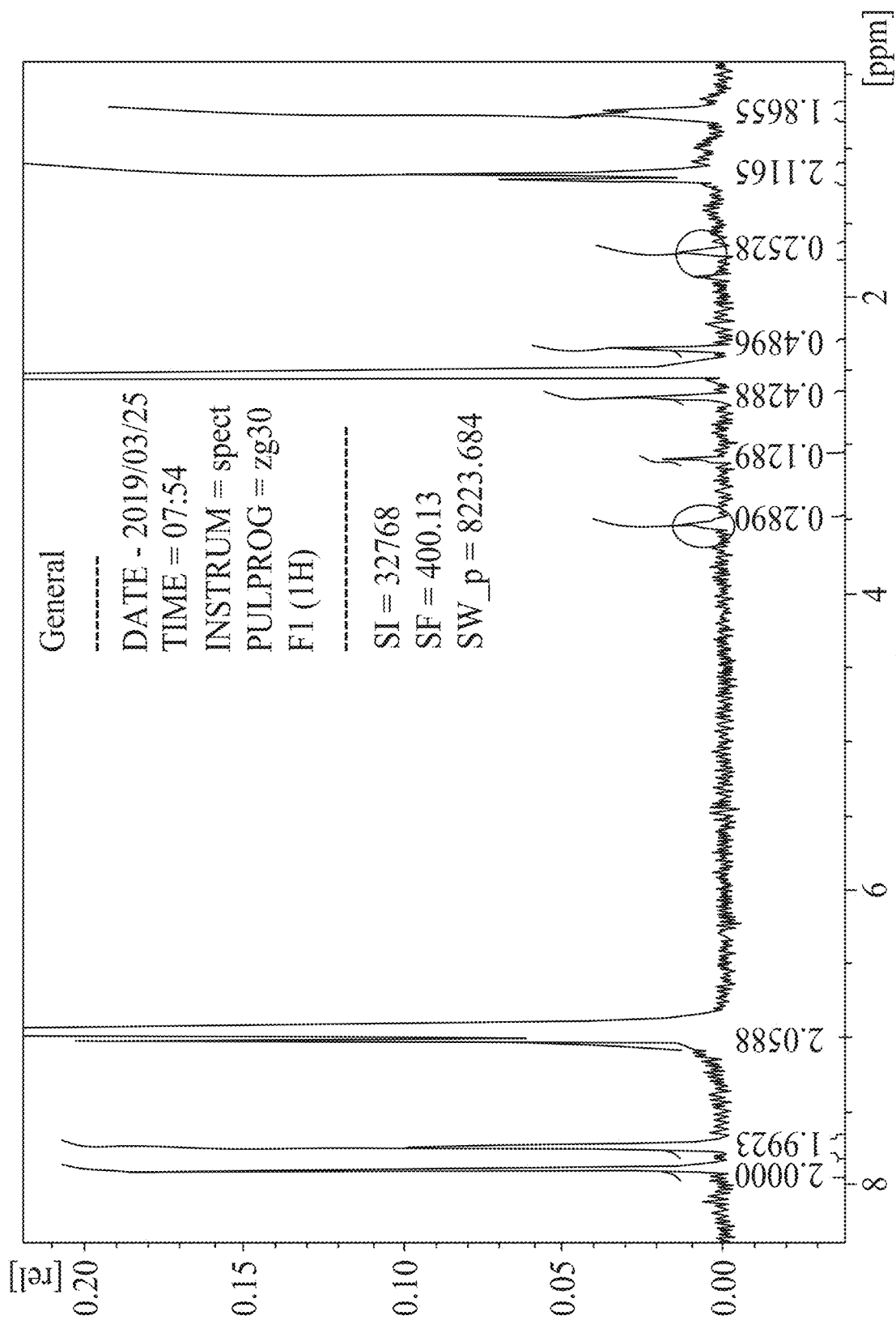
FIG. 13 is a graphical depiction of $^1$H NMR spectrum of digested MOF-274 prepared with 5% 3-hydroxypropionic acid.

Confirmation of modulator incorporation was achieved by digesting samples of the MOF-274 in DMSO with 1-2 drops of DCl in $D_2O$, then collecting 1H NMR spectra and normalizing the peak area integrations for the incorporated modulator by the peaks attributable to the ligand in the metal-organic framework. For 3-hydroxypropionic acid-modulated MOF-274, characteristic peaks are present at 3.48 and 1.64 ppm, which are clearly distinct from other molecules comprising the MOF-274 framework. This allows for a presentation of the integrated value as a function of percent modulator included in the original synthesis. Results are shown in Table 1 and FIG. 10. $^1H$ NMR spectra are provided for each of the concentrations as FIGS. 11 to 13.

TABLE 1

Percentage of 3-Hydroxypropionic acid Incorporation

| | $^1$H NMR Peak Integration | | % molecular incorporation | | |
|---|---|---|---|---|---|
| | 3.48 ppm | 1.64 ppm | 3.48 ppm | 1.64 ppm | Average |
| 5% 3-Hydroxy-propionic acid | 0.1828 | 0.1828 | 8.4% | 8.4% | 8.4% |
| 10% 3-Hydroxy-propionic acid | 0.1778 | 0.1391 | 8.2% | 6.5% | 7.3% |
| 15% 3-Hydroxy-propionic acid | 0.2890 | 0.2528 | 12.6% | 11.2% | 11.9% |

Certain features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing description of the disclosure illustrates and describes the present methodologies. Additionally, the disclosure shows and describes exemplary methods, but it is to be understood that various other combinations, modifications, and environments may be employed and the present methods are capable of changes or modifications within the scope of the concept as expressed herein, commensurate with the above teachings and/or the skill or knowledge of the relevant art.

What is claimed is:

1. A metal-organic framework of the general formula: $M^1_x M^2_{(2-x)}(A)$, wherein $M^1$ and $M^2$ are each independently different metal cations, A is a combination of a disalicylate organic linker and a modulator different from the disalicylate linker that has a coordinating site, and x is a value from 0.0 to 2.0, wherein the metal-organic framework comprises a localized defect formed by the modulator.

2. The metal-organic framework of claim 1, wherein $M^1$ and $M^2$ are both independently a divalent metal cation.

3. The metal-organic framework of claim 1, wherein $M^1$ and $M^2$ are selected independently from $Ca^{2+}$, $Mg^{2+}$, $Fe^{2+}$, $Cr^{2+}$, $V^{2+}$, $Mn^{2+}$, $Co^{2+}$, $Ni^{2+}$, $Zn^{2+}$, or $Cu^{2+}$.

4. The metal-organic framework of claim 1, wherein A comprises a plurality of linkers selected independently from a group consisting of:

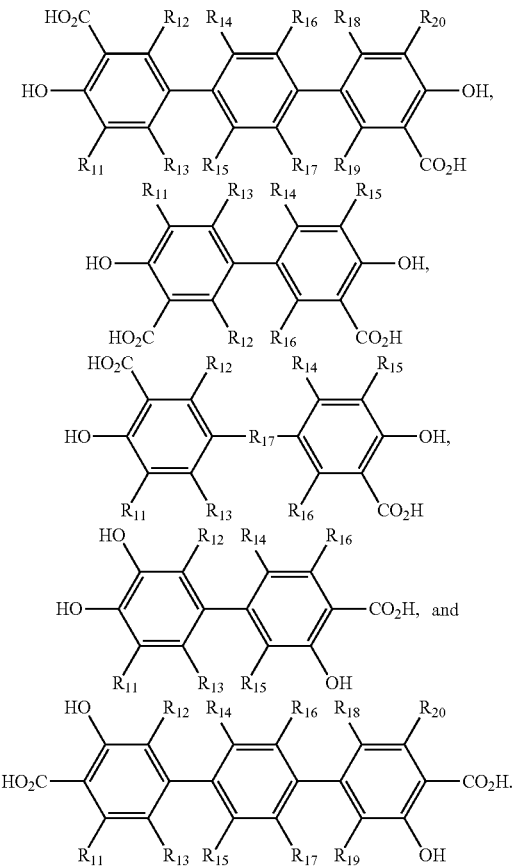

wherein $R_{11}$, $R_{12}$, $R_{13}$, $R_{14}$, $R_{15}$, $R_{16}$, $R_{17}$, $R_{18}$, $R_{19}$, and $R_{20}$ are each independently selected from H, halogen, hydroxyl, methyl, and halogen substituted methyl; and $R_{17}$ is selected from the group consisting of substituted or unsubstituted aryl, vinyl, alkynyl, substituted or unsubstituted heteroaryl, divinyl benzene, and diacetyl benzene.

5. The metal-organic framework of claim 1, where the modulator is a fully or partially deprotonated beta-hydroxy carboxylic acid.

6. The metal-organic framework of claim 5, where the beta-hydroxy carboxylic acid is selected from one or more of 3-hydroxypropionic acid, salicylic acid, or a functionalized derivative thereof.

7. The metal-organic framework of claim 1, wherein the metal-organic framework provides an X-ray diffraction pattern that can be indexed to a hexagonal unit cell.

8. A metal-organic framework system comprising the metal-organic framework of claim 1 and a ligand comprising an amine.

9. The metal-organic framework system of claim 8, wherein the ligand is a diamine.

10. The metal-organic framework system of claim 8, wherein the diamine is a cyclic diamine.

11. The metal-organic framework system of claim 8, wherein the diamine is independently selected from:

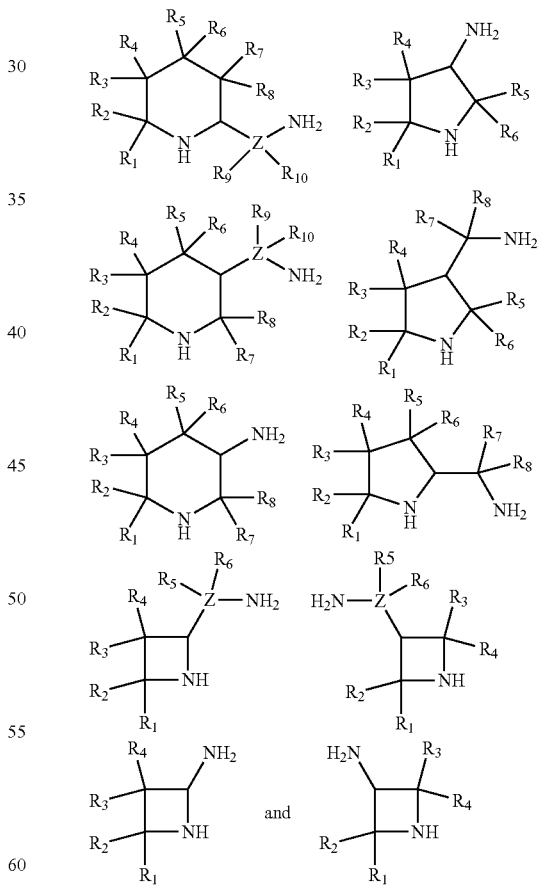

wherein Z is independently selected from carbon, silicon, germanium, sulfur and selenium; and $R_1$, $R_2$, $R_3$, $R_4$, $R_5$, $R_6$, $R_7$, $R_8$, $R_9$, and $R_{10}$, are each independently selected from H, halogen, methyl, halogen substituted methyl and hydroxyl.

12. The metal-organic framework system of claim 8, wherein the diamine ligand is selected from one of: dimethylethylenediamine (mmen) or 2-(aminomethyl) piperidine (2-ampd).

13. The metal-organic framework system of claim 8, wherein the ligand is a tetramine.

14. The metal-organic framework system of claim 13, wherein the tetramine is selected from one of 3-4-3 tetramine (spermine) or 2-2-2 tetramine.

15. The mixed organic framework system of claim 8 wherein the ligand is selected from:

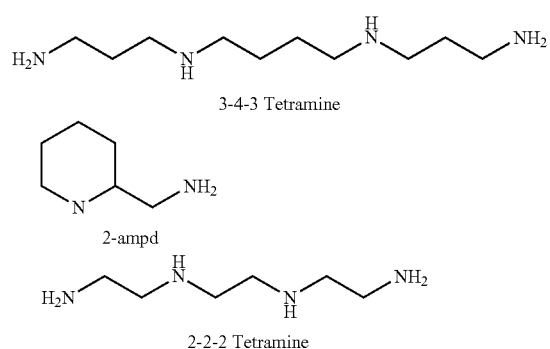

3-4-3 Tetramine 2-ampd 2-2-2 Tetramine

-continued

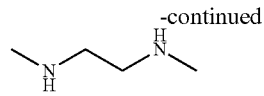

dimethylethylenediamine ("mmen").

16. A method of synthesizing the metal-organic framework of claim 1, comprising the steps of:
  1) contacting a solution comprising one or more sources of distinct metallic elements and an organic linker capable of bridging metal chains, and a modulator, and
  2) Heating the mixture to produce the metal-organic framework comprising a localized defects.

17. The method of claim 16, wherein the metallic elements are selected independently from Ca, Mg, Fe, Cr, V, Mn, Co, Ni, Zn, or Cu.

18. The method of claim 16, wherein the solution comprises an elemental metal or a salt of the metal in which the counter anion comprises a nitrate, acetate, carbonate, oxide, hydroxide, fluoride, chloride, bromide, iodide, phosphate, or acetylacetonate.

19. A method of synthesizing the metal-organic framework of claim 1, comprising the steps of contacting the metal-organic framework comprising a localized defect with a secondary ligand in a gas or liquid medium, wherein the secondary ligand is an amine-containing molecule, a diamine, a triamine, or a tetramine.

* * * * *